Aug. 5, 1952        R. R. WILSON        2,606,291

METHOD AND APPARATUS FOR MATERIAL SEPARATION

Filed March 11, 1946        19 Sheets-Sheet 1

WITNESSES.

INVENTOR.
Robert R. Wilson
BY

Aug. 5, 1952 R. R. WILSON 2,606,291
METHOD AND APPARATUS FOR MATERIAL SEPARATION
Filed March 11, 1946 19 Sheets-Sheet 2
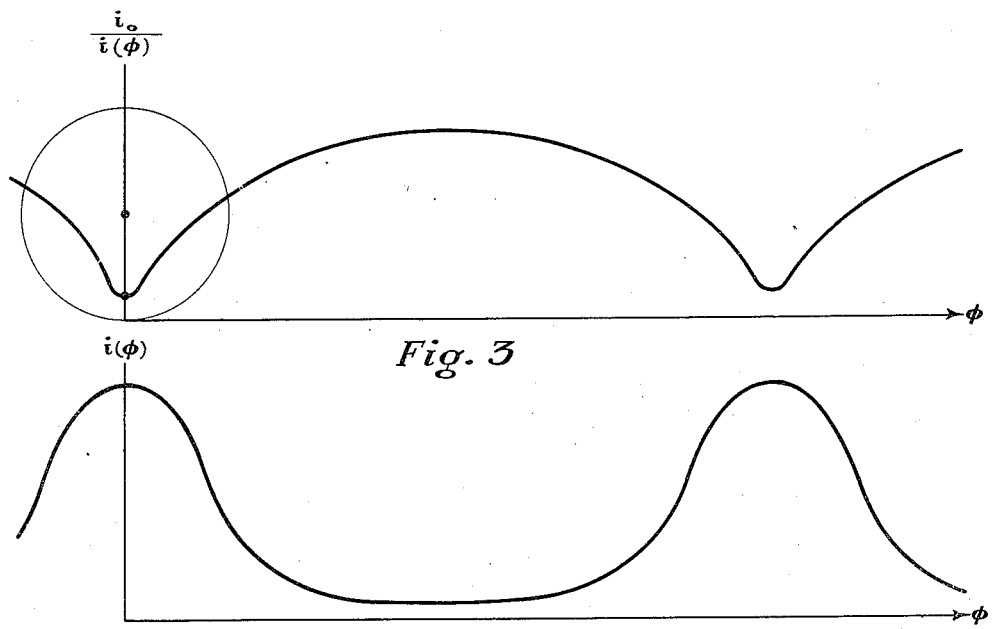
Fig. 3
Fig. 3a
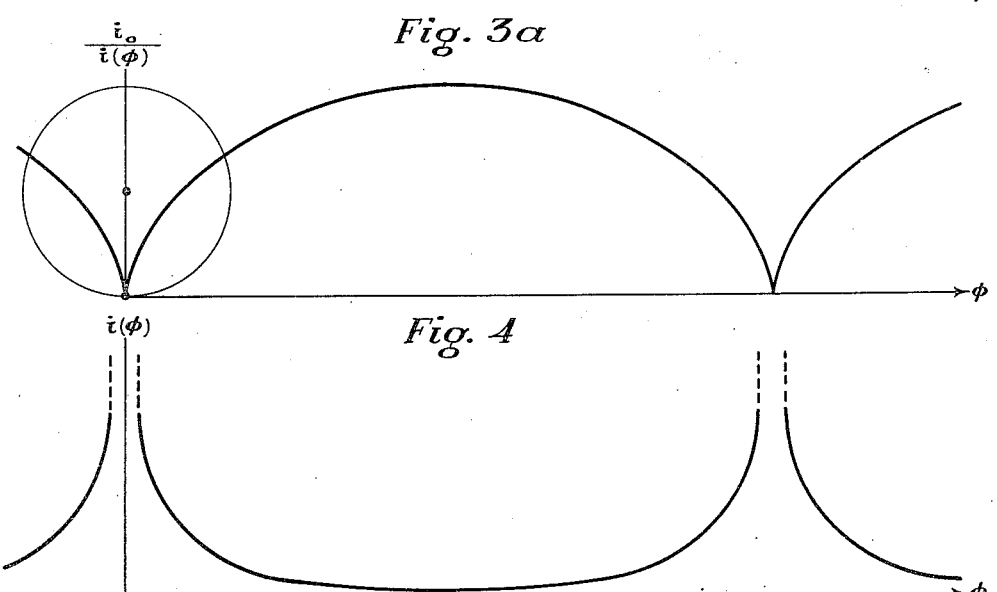
Fig. 4
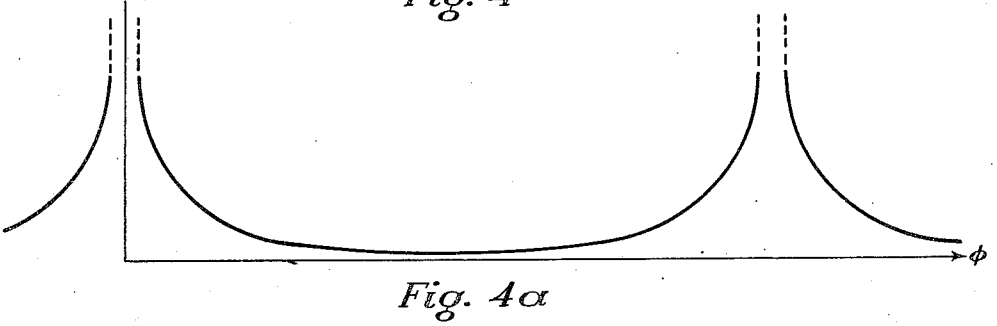
Fig. 4a
WITNESSES.
Ralph Carlisle Smith
Herbert J. Fuller
INVENTOR.
Robert R. Wilson
BY
Robert R. Townsend Aug. 5, 1952        R. R. WILSON        2,606,291
METHOD AND APPARATUS FOR MATERIAL SEPARATION
Filed March 11, 1946        19 Sheets-Sheet 3

WITNESSES.        INVENTOR.
Robert R. Wilson
BY

Aug. 5, 1952  R. R. WILSON  2,606,291
METHOD AND APPARATUS FOR MATERIAL SEPARATION
Filed March 11, 1946  19 Sheets-Sheet 4

INVENTOR.
Robert R. Wilson
BY

Aug. 5, 1952  R. R. WILSON  2,606,291
METHOD AND APPARATUS FOR MATERIAL SEPARATION
Filed March 11, 1946  19 Sheets-Sheet 6

INVENTOR.
Robert R. Wilson
BY

Aug. 5, 1952 R. R. WILSON 2,606,291
METHOD AND APPARATUS FOR MATERIAL SEPARATION
Filed March 11, 1946 19 Sheets-Sheet 7

WITNESSES.
Ralph Carlisle Smith
Herbert J. Miller

INVENTOR.
Robert R. Wilson
BY

Aug. 5, 1952            R. R. WILSON            2,606,291

METHOD AND APPARATUS FOR MATERIAL SEPARATION

Filed March 11, 1946                         19 Sheets-Sheet 8

WITNESSES.                                INVENTOR.

Robert R. Wilson

BY

Aug. 5, 1952            R. R. WILSON            2,606,291
METHOD AND APPARATUS FOR MATERIAL SEPARATION
Filed March 11, 1946            19 Sheets-Sheet 10

WITNESSES.

INVENTOR.
Robert R. Wilson
BY

Aug. 5, 1952  R. R. WILSON  2,606,291
METHOD AND APPARATUS FOR MATERIAL SEPARATION
Filed March 11, 1946  19 Sheets-Sheet 12

WITNESSES.

INVENTOR.
Robert R. Wilson
BY

Aug. 5, 1952  R. R. WILSON  2,606,291
METHOD AND APPARATUS FOR MATERIAL SEPARATION
Filed March 11, 1946  19 Sheets-Sheet 13

WITNESSES.

INVENTOR.
Robert R. Wilson
BY

Aug. 5, 1952    R. R. WILSON    2,606,291
METHOD AND APPARATUS FOR MATERIAL SEPARATION
Filed March 11, 1946    19 Sheets-Sheet 16

WITNESSES.

INVENTOR.
Robert R. Wilson
BY

Aug. 5, 1952     R. R. WILSON     2,606,291
METHOD AND APPARATUS FOR MATERIAL SEPARATION
Filed March 11, 1946     19 Sheets-Sheet 17

WITNESSES.

INVENTOR.
Robert R. Wilson
BY

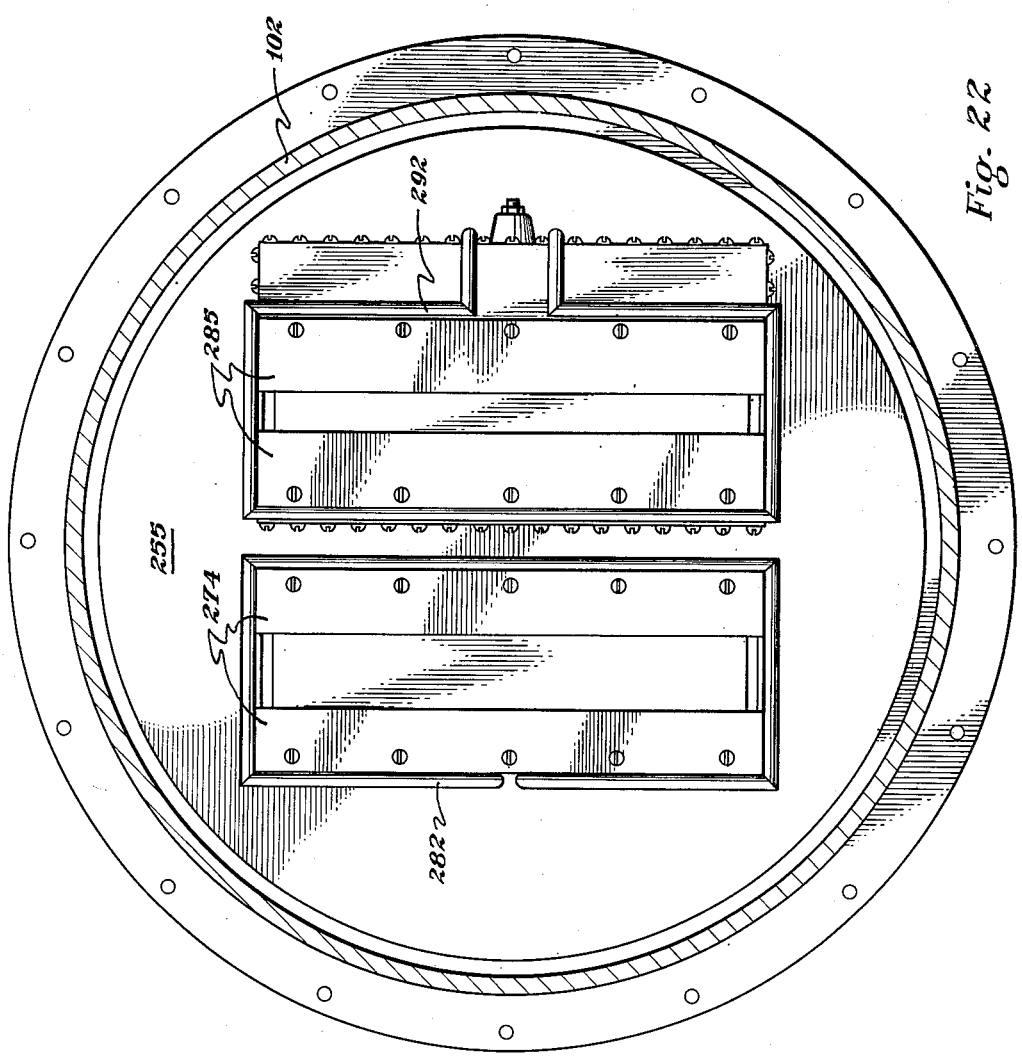

Aug. 5, 1952 R. R. WILSON 2,606,291
METHOD AND APPARATUS FOR MATERIAL SEPARATION
Filed March 11, 1946 19 Sheets-Sheet 19

WITNESSES.

INVENTOR.
Robert R. Wilson
BY

Patented Aug. 5, 1952

2,606,291

UNITED STATES PATENT OFFICE 2,606,291

METHOD AND APPARATUS FOR MATERIAL SEPARATION

Robert R. Wilson, Cambridge, Mass., assignor to the United States of America as represented by the United States Atomic Energy Commission Application March 11, 1946, Serial No. 653,518

15 Claims. (Cl. 250—41.9)

This invention relates generally to material separation and has particular importance in the separation of materials which differ only slightly in mass, as for example, isotopes of the same element.

Such separations have been carried out by employing electric fields to accelerate charged particles of the mixed materials (e. g., in the form of ions) into a magnetic zone of predetermined flux intensity and distribution. Separation then, takes place by reason of the curved paths of different radii followed by said particles according to their charge to mass ratios. With small ion beam currents (i. e., of the order of microamperes) the resolution of "separating ability" of such devices is relatively high, however quantity isotope separation by these methods can only be accomplished at a prohibitive expense over a long period of time. Furthermore, with larger beam currents auxiliary considerations compel the employment of complex, expensive equipment, large electromagnets and the like as well as require large plant areas.

It is an object of the present invention to provide an improved type of material separator which is capable of separating relatively large amounts of mixed materials in short periods of time.

A further object of the present invention is to provide an improved linear type of material separator for separating large quantities of mixed isotopes in relatively short periods of time.

It is a further object of the present invention to provide novel methods and means for modulating charged particle beams to effect separation of the components thereof.

Is is a still further object of the present invention to provide novel means and methods for analyzing velocity modulated charged particle beams to effect collection of the separated components of the beam.

Another object of the present invention is to provide a compact device for accomplishing isotope separation which is readily adaptable to multiple unit operation.

Still another object of the invention is the provision of a flexible method and means for accomplishing isotope separation which can be readily adapted to small scale or large quantity production and to a multiplicity of materials.

Still another object of the present invention is to provide a method and means for separating atomic masses wherein a substantially plane source of charged particles of heterogeneous mass can be employed.

Other objects and advantages of the invention will be apparent from the discussion herein of the general principles involved and the description of illustrative examples of preferred and other embodiments of the invention.

The broad objects stated are accomplished by passing an accelerated, mixed, charged particle beam through a zone in which an electric field varying with time in a predetermined manner modulates the velocities of the individual particles to cause a grouping, bunching or concentration thereof in discrete bunches or groups, according to their mass and charge during subsequent travel in a substantially field-free zone, and subjecting said discrete bunches to the action of an electric field in such a manner that at least one group of particles is deflected into a separated zone from the zone into which another group of different type particles is collected.

It is apparent that the dependence on the mass of the motion of the charged particles which are preferably ions through time varying electric fields presents many problems, the principles of which will be analyzed hereinafter, and the solutions of which are embodied in the illustrative devices hereinafter described.

The apparatus for producing mass separation by velocity modulation of the charged particles in a heterogeneous mass beam, which apparatus has been identified by the name isotron, generally comprises an extended source of mixed charged particles which communicates with an elongated evacuated chamber or tube of predetermined proportions; an electrode system within this chamber which may be referred to as a "buncher" for rhythmically impressing increments of acceleration upon the atomic charged particle masses passing therethrough; to produce different type bunches of charged particles; a substantially field-free space of definite length immediately following and adjoining the buncher, a focusing-deflector electrode system, called an analyzer to effect separation of the different type bunches; one or more collectors, receivers or zones in which the separated masses are accumulated, and a source of radio frequency power for the buncher and focusing-deflector electrodes together with a source of direct current power for the accelerating electrodes associated with the source and for the focusing-deflector electrodes.

The explanation given will be understood better when taken in connection with the drawings made part of this specification, in which.

Figures 3 and 3a, 4 and 4a, and 5 and 5a, are charts showing the evolution of various types of bunching through the use of various wave forms in the alternating potential applied to the buncher.

Figure 6:
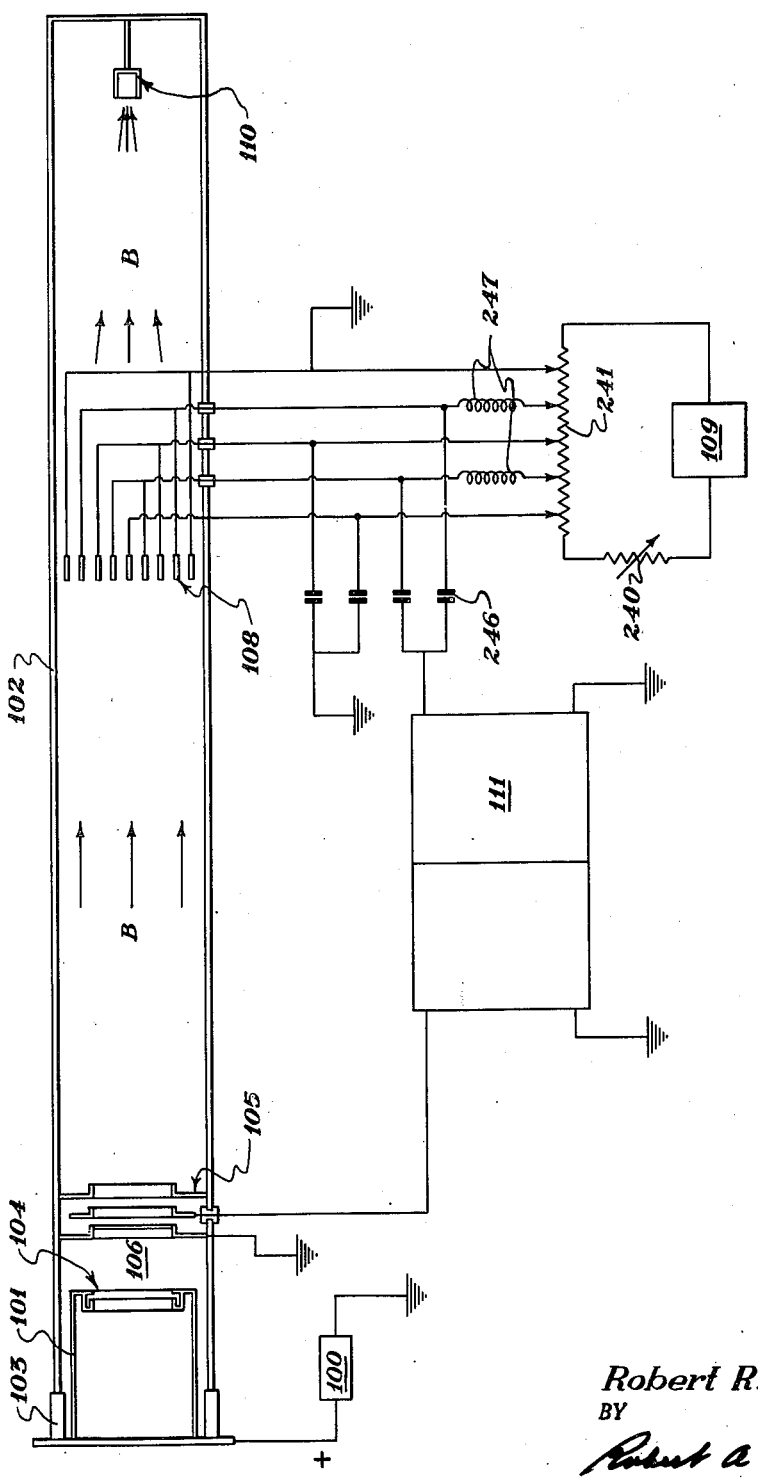

Figure 6 is a schematic representation in longitudinal cross section of a mass separating device constructed according to the principles of the present invention.

Figure 7:
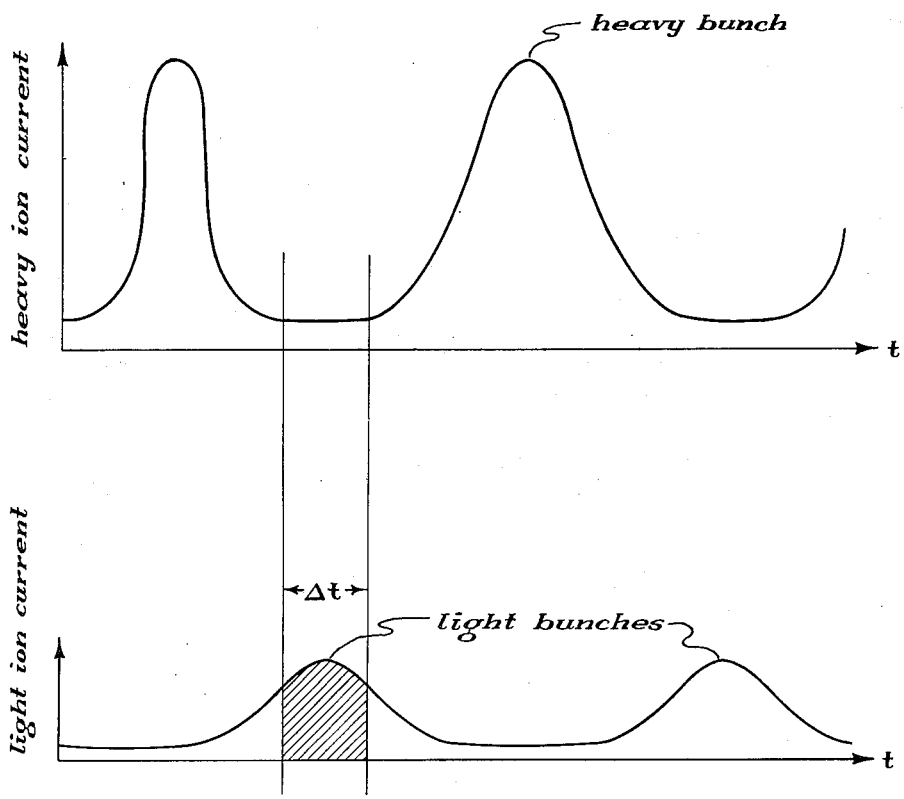

Figure 7 is a chart showing the variation with time of the currents of different charged particles arriving at the analyzer.

Figure 8:
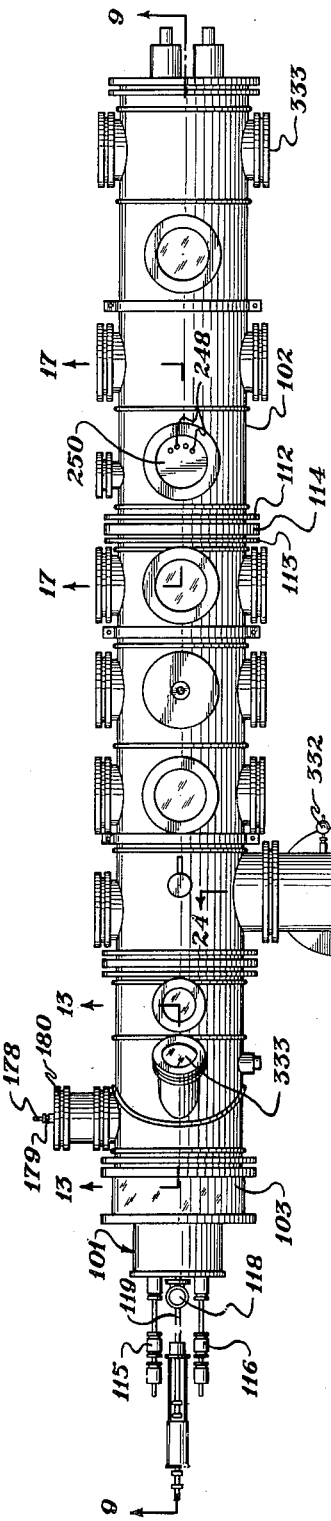

Figure 8 is a top view of an assembled isotron tube.

Figure 9:
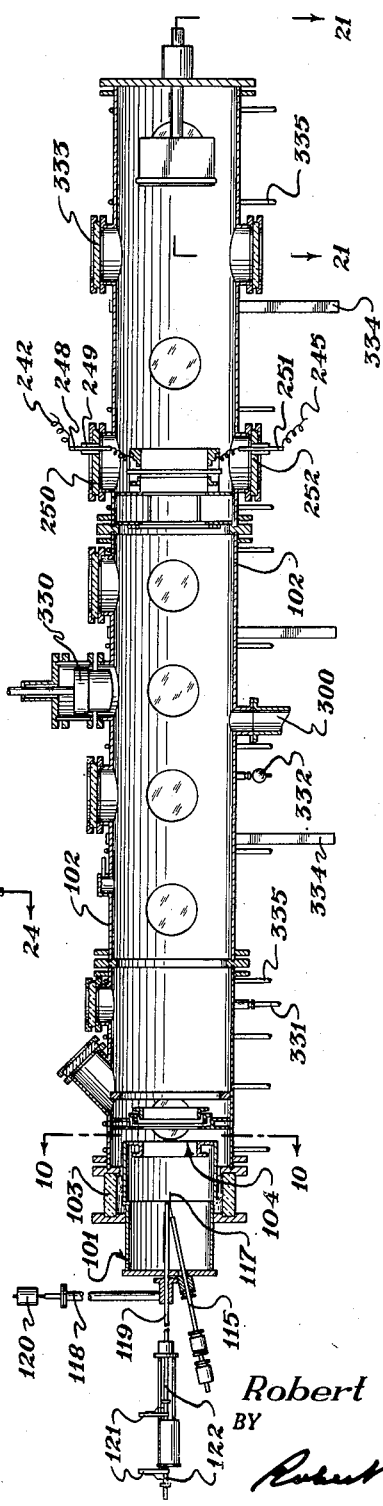

Figure 9 is a longitudinal sectional view of the isotron tube shown in Figure 8, taken on the line 9—9 of Figure 8.

Figure 10:
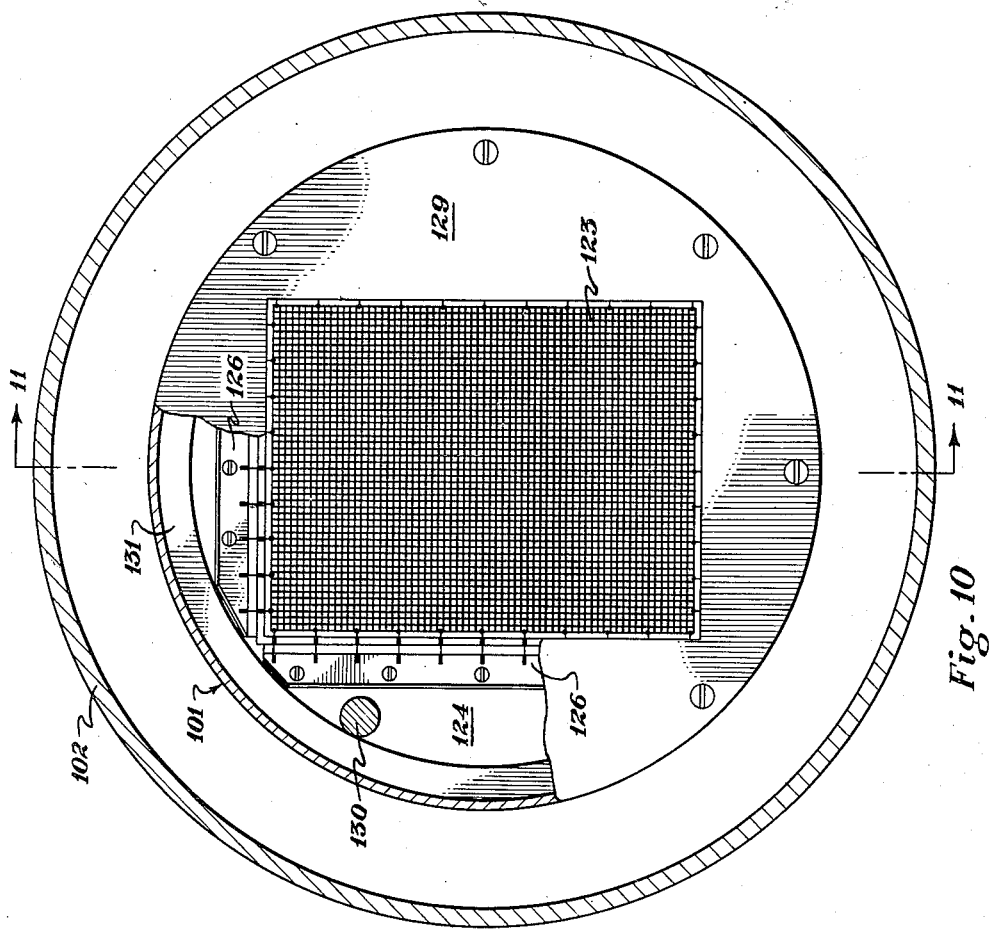

Figure 10 is a transverse sectional view taken on the line 10—10 of Figure 9 showing in partly broken away elevation, one type of source screen construction and indicating the three-dimensional character of the charged particle beam employed in the present invention.

Figure 11:
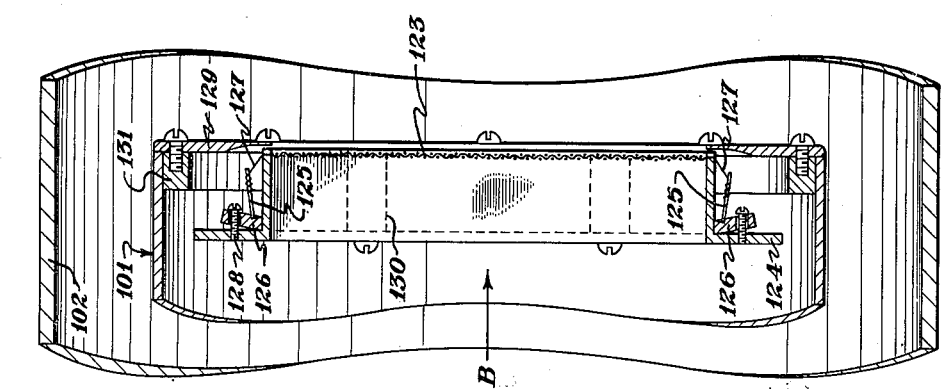

Figure 11 is a sectional view of the source screen shown in Figure 10 taken on the line 11—11.

Figure 11A:
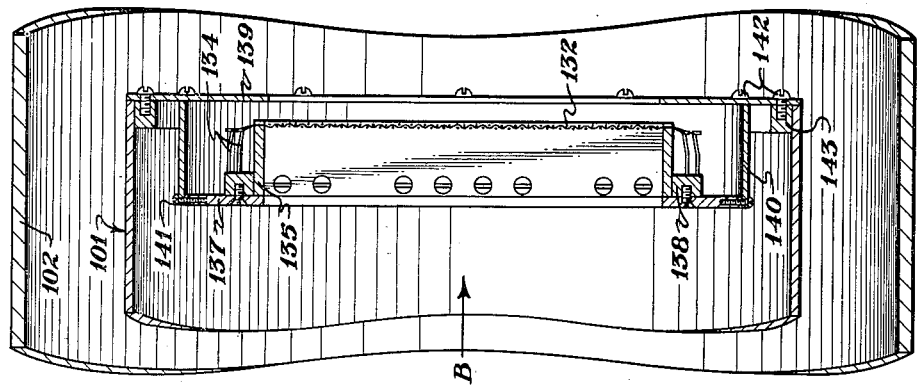
Figure 10A:
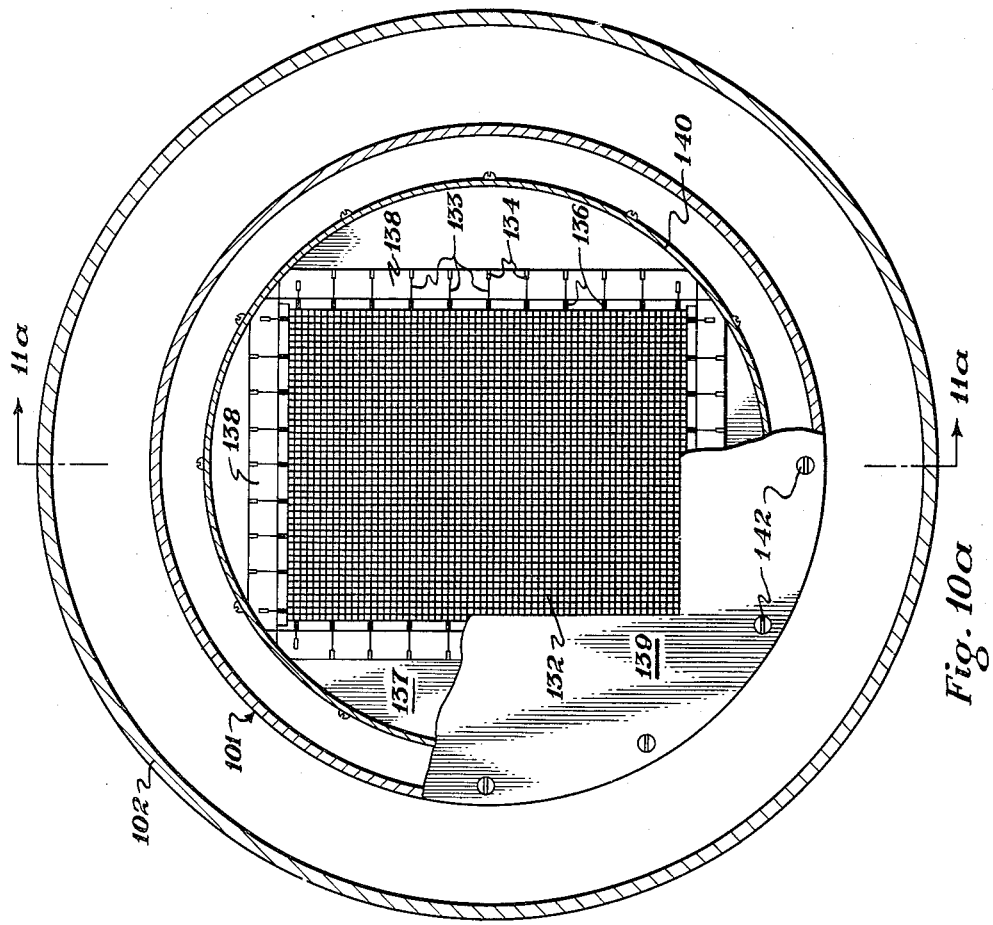

Figures 10a and 11a are views similar to Figures 10 and 11, showing alternative construction for the source screen.

Figure 12:
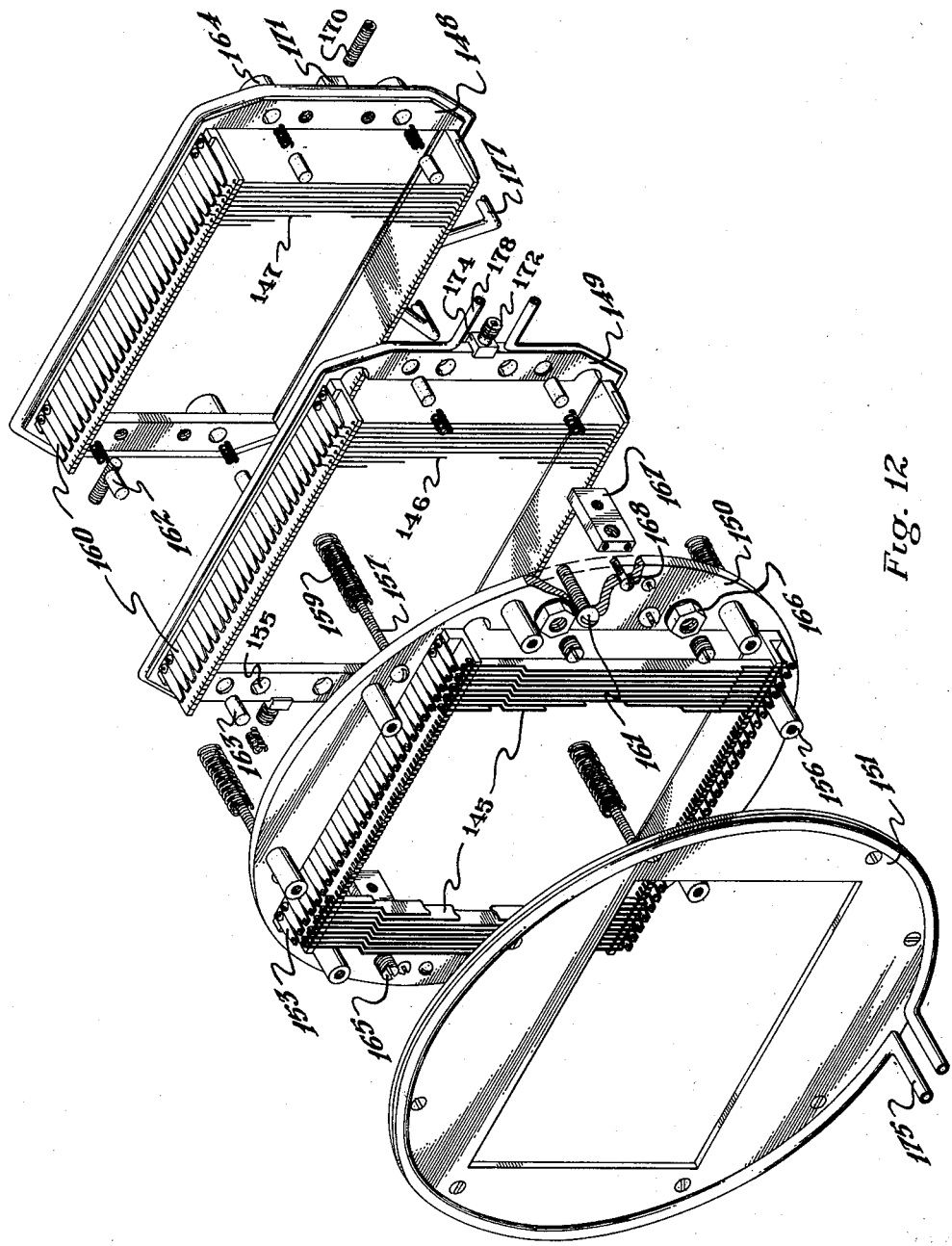

Figure 12 is an exploded isometric view showing in detail the component parts of a three grid buncher electrode.

Figure 13:
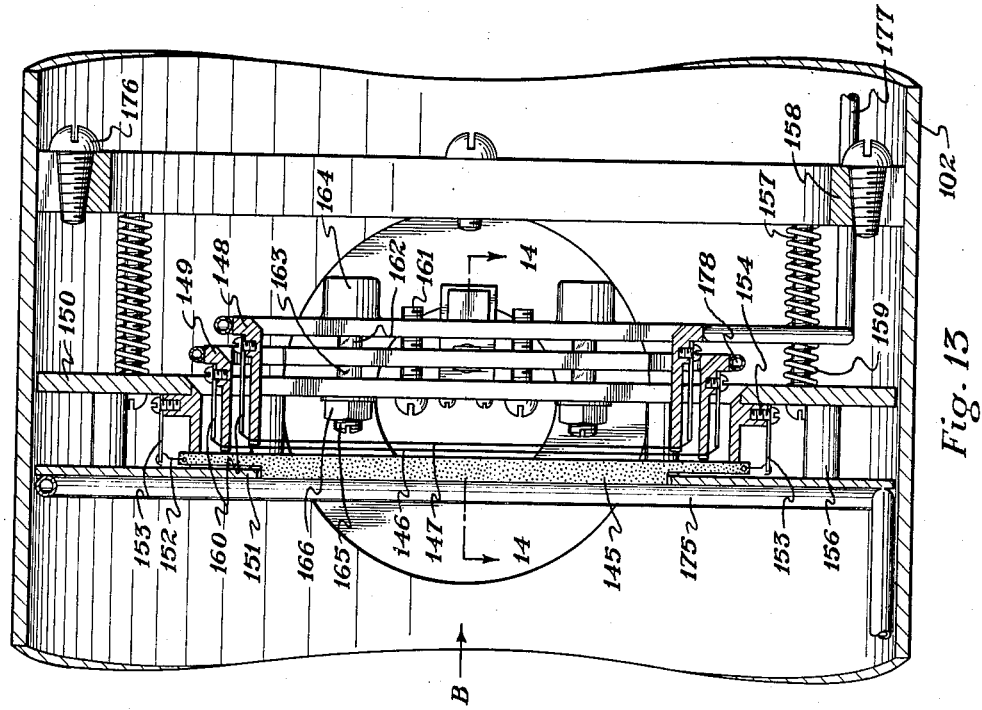

Figure 13 is a sectional view of the same buncher electrode shown in Figure 12, assembled in the isotron tube, the section being taken on the line 13—13 in Figure 8.

Figure 14:
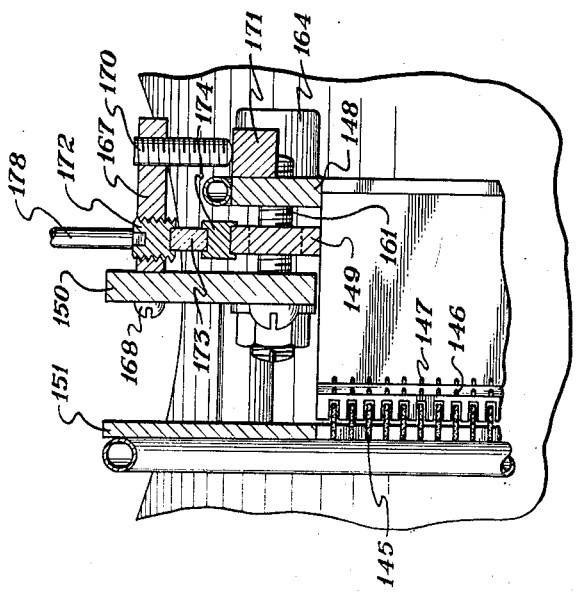

Figure 14 is an enlarged sectional view taken on the line 14—14 in Figure 13, showing more details of the construction of the buncher.

Figure 15:
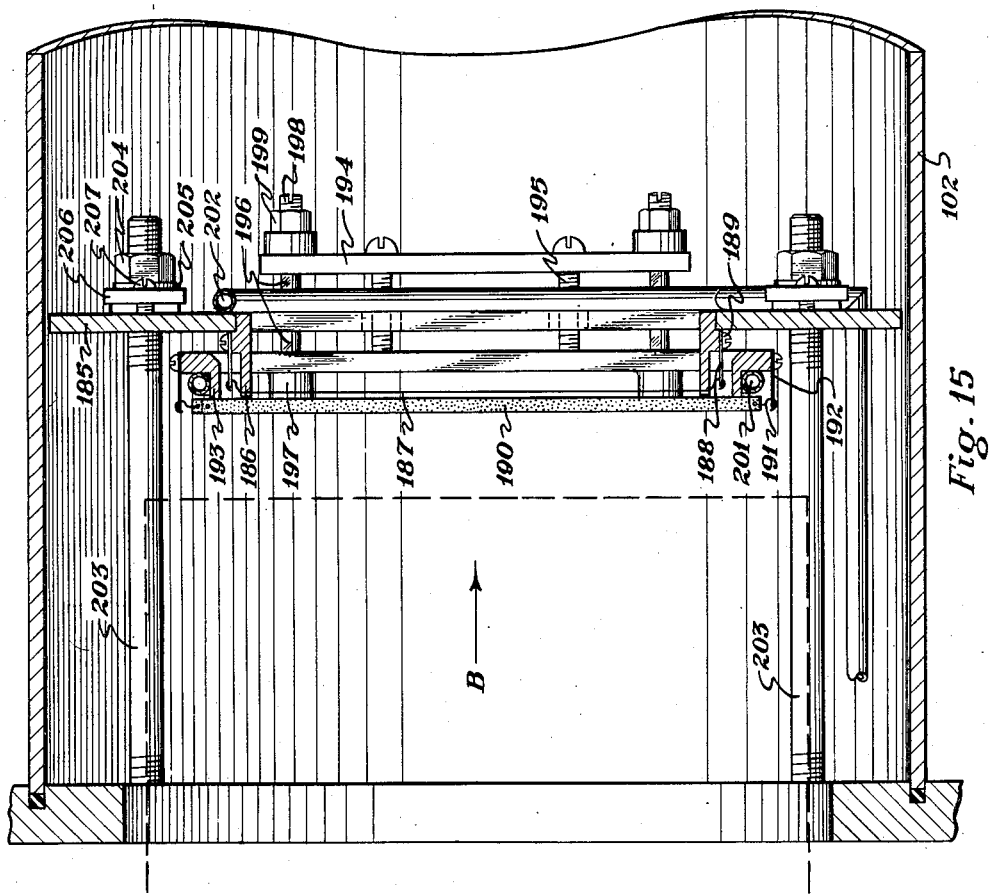

Figure 15 is a sectional view of a two grid buncher which may be used in place of the three grid buncher shown in the preceding figures in a particular application, the section being taken in a manner similar to that of Figure 13.

Figure 16:
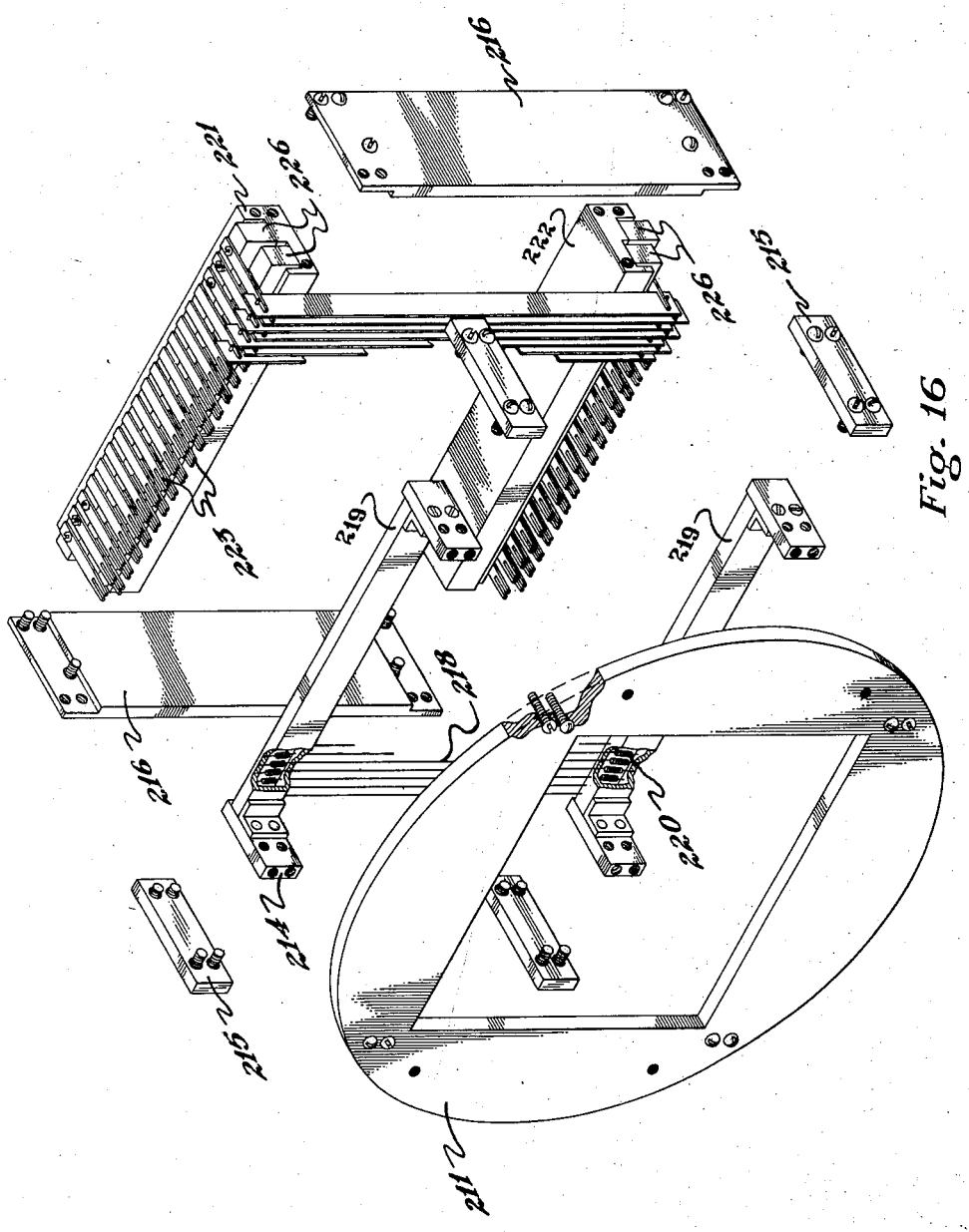

Figure 16 is an exploded isometric view showing in detail the component parts of an analyzer electrode.

Figure 17:
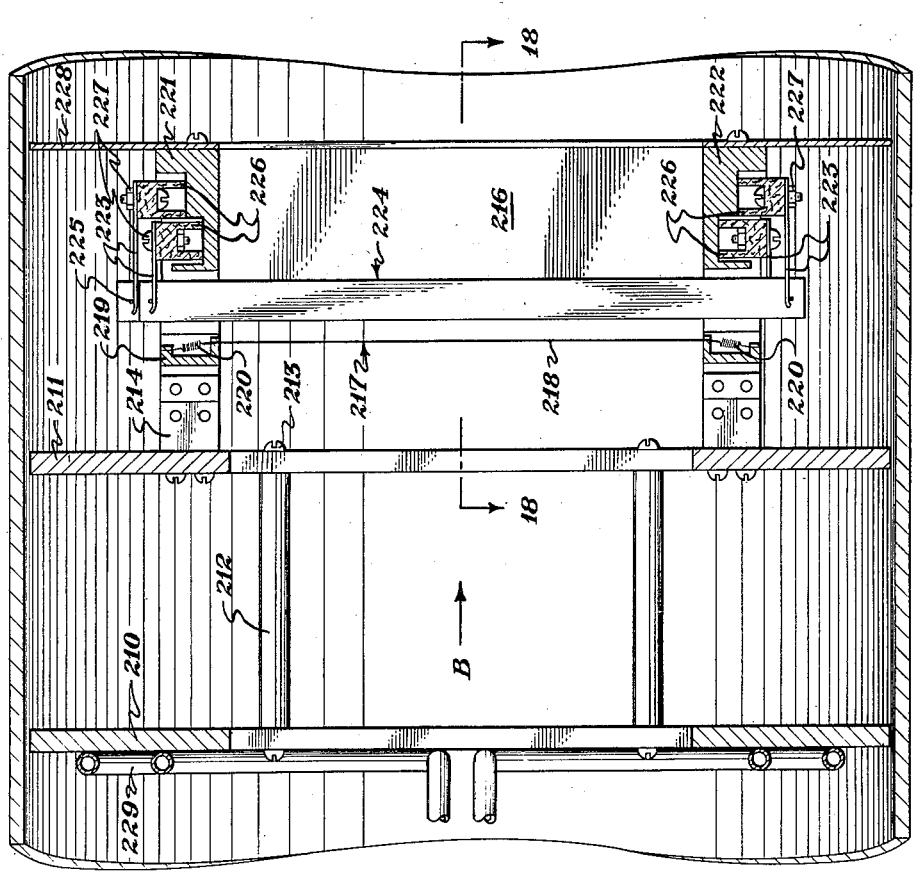

Figure 17 is a sectional view of the same analyzer electrode shown in Figure 16, assembled in the isotron tube, the section being taken on line 17—17 in Figure 8.

Figure 18:
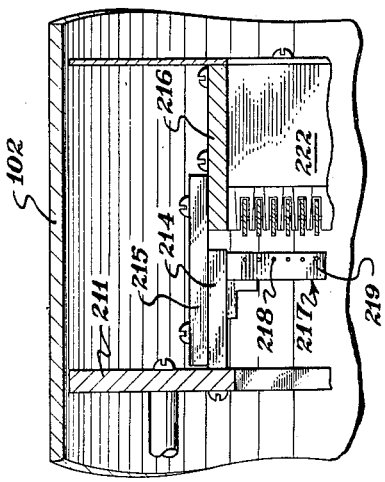

Figure 18 is an enlarged sectional view taken on the line 18—18 in Figure 17, showing construction details of the analyzer.

Figure 19:
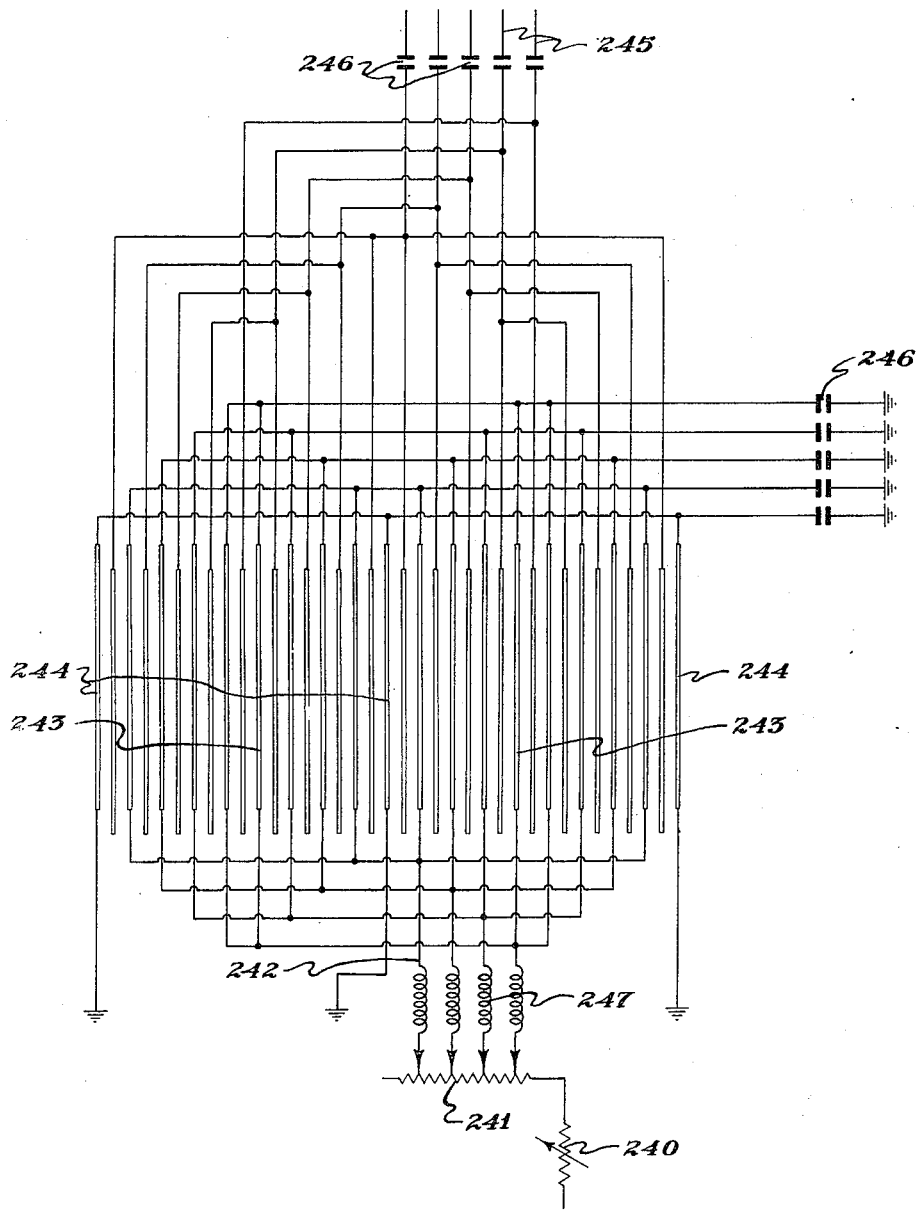

Figure 19 is a diagram of the wiring connections for the strips of the analyzer shown in the preceding three figures.

Figure 20:
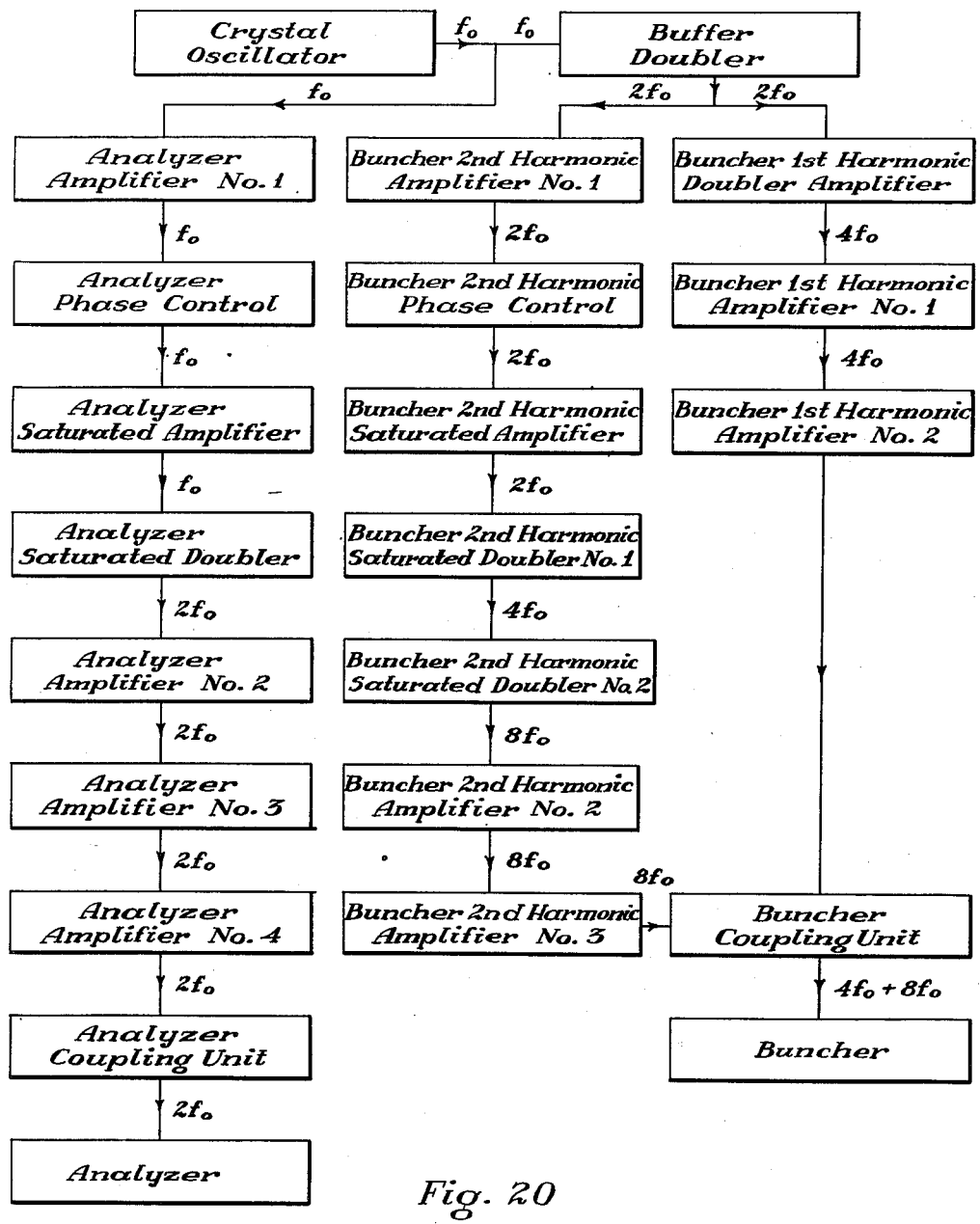

Figure 20 is a diagram of the electronic elements employed in producing the alternating potentials applied to the buncher and analyzer electrodes, the frequency of this potential being indicated as multiples of the basic frequency, $F_0$.

Figure 21:
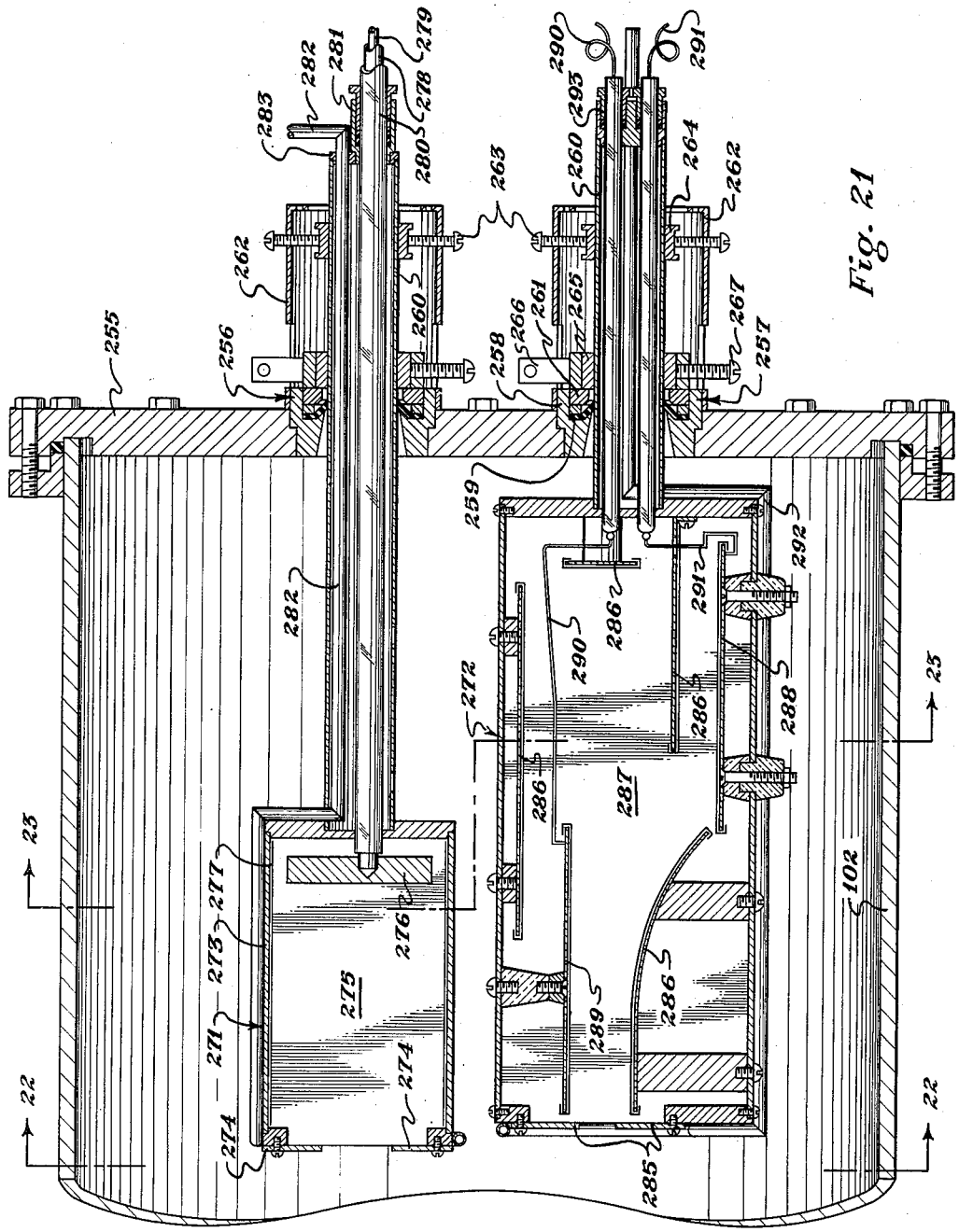

Figure 21 is a sectional view taken on the line 21—21 in Figure 9, showing construction details of two types of collectors for separated materials.

Figure 22 is an elevational view partly in section, taken on the line 22—22 in Figure 21, showing the arrangement of the collectors in the isotron tube.

Figure 23:
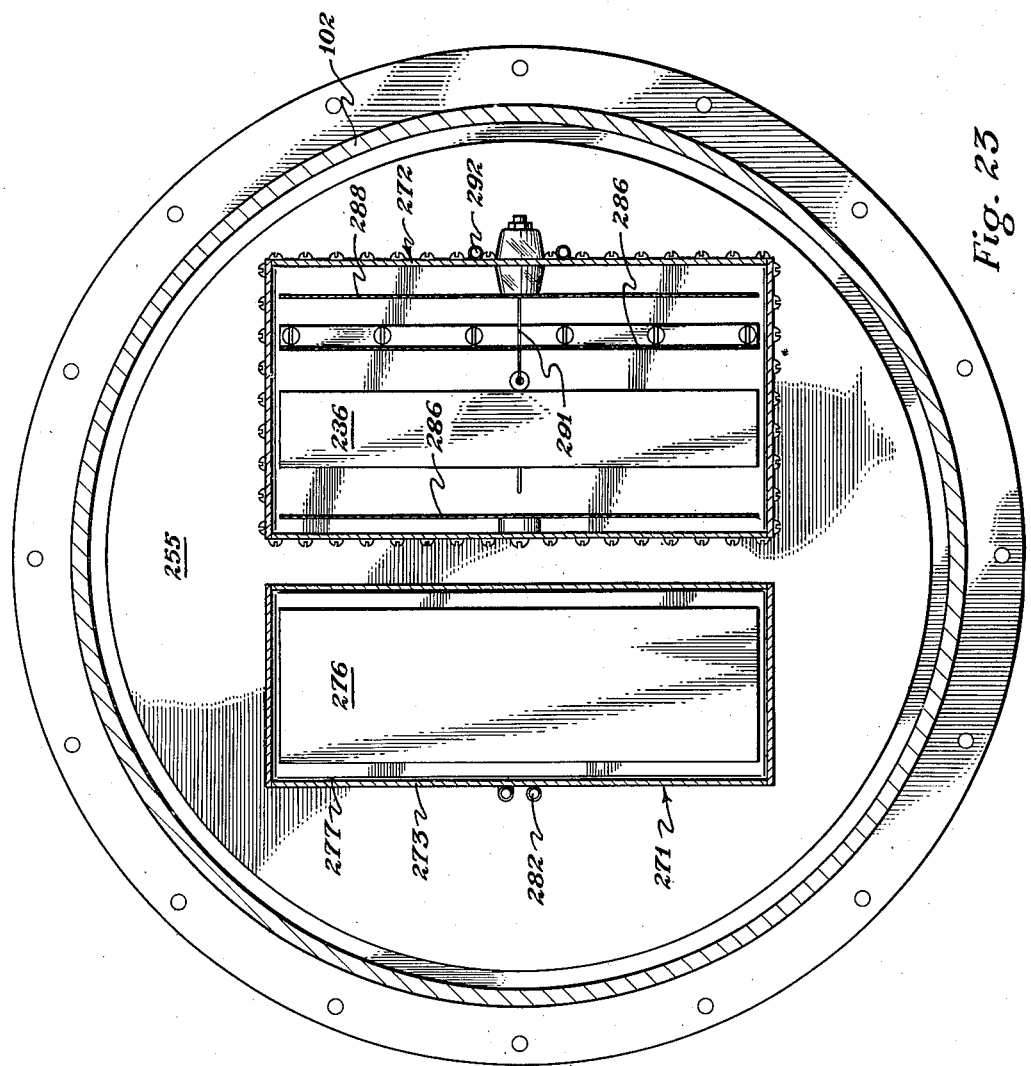

Figure 23 is a sectional view taken on the line 23—23 in Figure 21, indicating the relative positions of elements of the collectors shown in Figure 21 and the vertical dimensions thereof.

Figure 24:
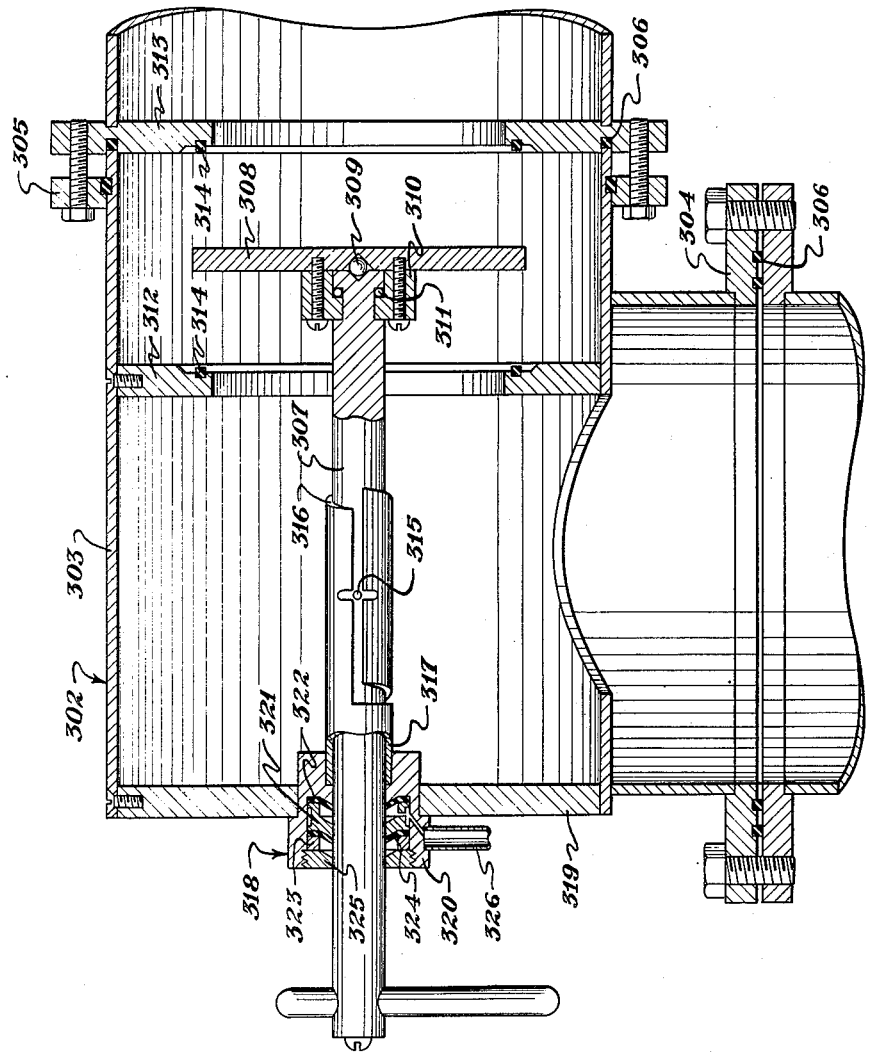

Figure 24 is a sectional view on the line 24—24 in Figure 8 showing details of the gate valve in the vacuum system employed for reducing the isotron tube to the desired subatmospheric state.

If ions from a source are accelerated to a definite, uniform speed and pass through an electric field which alternately speeds up and slows down by small amounts the ions passing through it, a certain amount of grouping or bunching of the ions can be made to take place. The beam of ions passing through such a varying field is velocity-modulated but not appreciably intensity-modulated. That is, ions emerging from the field during one portion of a cycle of the alternating impressed voltage are very slightly faster than the average, and those emerging during another portion of the cycle are very slightly slower than the average, but the number of ions emerging per unit time is unvaried. Bunching takes place as the ions emerging at a slightly faster than average velocity catch up with the slow ions which emerged from the alternating field previously. It should be noted that generally speaking, inasmuch as the amount of material which can be handled in the alternating field during each cycle is limited, it has been found desirable to employ frequencies in the radio-frequency range to effect velocity modulation of the ion beam where quantity separation is required.

Figure 1:
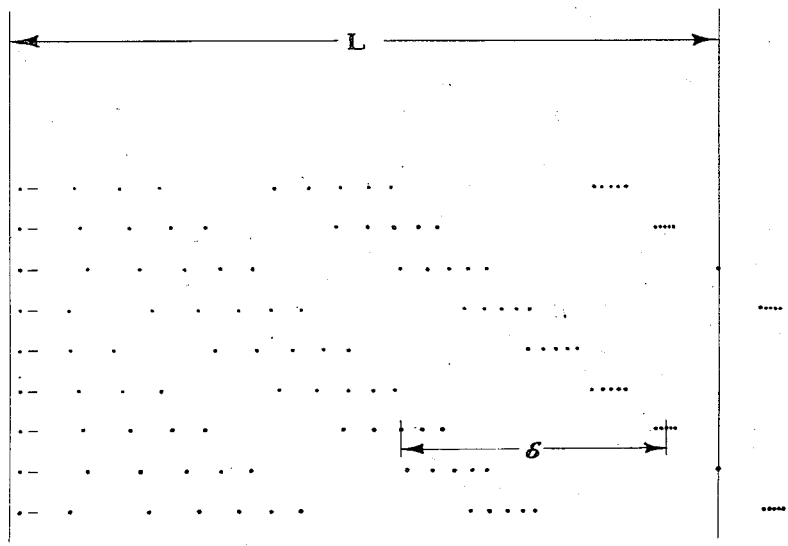
Figure 1 is a diagram showing in a series of steps the segregation of like charged particles into bunches during their travel between the buncher and the analyzer electrodes.

The bunching which takes place as the faster ions catch up with the slower ones is shown schematically in Figure 1, which represents a sequence of position views of a beam of identical ions. The ions are shown emerging from the buncher at the left and moving toward the right, through a field free space denoted by L. Each horizontal line represents an individual view, the earliest appearing at the top (i. e., the time axis extends vertically downward). At a certain distance L (the significance of which will be explained later), along the beam, discrete groups of bunches are completely formed and segregation according to charge and/or mass has been completely accomplished. Denoting by $v_0$ the average speed of the ions in a particular bunch, by $\delta$ the distance along the beam from the center of one bunch to the center of the next (or more rigorously, from the center of gravity of one bunch to the center of gravity of the next), and by $f$ the frequency of the radio-frequency potential applied to the buncher then, $$v_0 = f\delta \qquad (1)$$

or in words, each bunch travels a distance $\delta$ during one period of the R. F.

It should be noted before entering an extended discussion of the various parameters which must be considered in pursuance of the novel methods of the present invention, that $\delta$ may be evaluated for a particular material by using Equation 1 in connection with the relationship $$\frac{1}{2}mv_0^2 = eV \text{ viz } \delta = \frac{\sqrt{\frac{2eV}{m}}}{f}$$

in which $e$ is taken for singly charged particles and is expressed, as is the accelerating voltage $V$, in electrostatic units, and $m$ is the mass of the desired ion in grams; $f$ is expressed in cycles per second, and $\delta$ in centimeters. Or $$\delta = \frac{44}{f}\sqrt{\frac{V}{A}} \qquad (1a)$$

in which V is expressed in kilovolts, $f$ in megacycles and A is the atomic weight of the desired material.

The case shown in Figure 1, is the ideal case of perfect bunching, which results from impressing a sawtooth wave form on the buncher electrode when the ion current is sufficiently small that the effects of space charge (which will be discussed in greater detail later), can be neglected.

Figure 2:
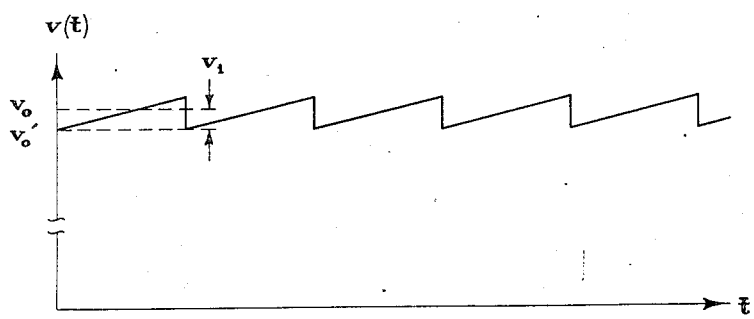
Figure 2 is a graph of the ideal velocity modulation impressed upon charged particles passing through the buncher.

An ion emerging from the bunching field at an instant $t$, has a velocity $v(t)$ shown by the graph in Figure 2 and retains this velocity during its motion, since the beam travels in a field free space after such emergence. Referring to Figure 2, $v_0$ is the average speed and is normally imparted by the accelerating voltage, while $v_1$ is the amplitude of the increment of velocity, sometimes positive and sometimes negative, imparted by the bunching field. Clearly the same result could be achieved by having the accelerating voltage impart a velocity $v'_0$ and applying a one-sided sawtooth wave of amplitude $2v_1$ to the buncher or by simply superposing a sawtooth wave on the accelerating voltage. However, as will become more apparent hereinafter, for reasons concerned with the simplification of instrumentation, the first named procedure is much preferred.

The average time required for a bunch to be completely formed or in other words to traverse the distance L is $$\frac{L}{v_0}$$

During this time the fastest ion in the bunch must move a distance $\delta$ further than the slowest ion and since the difference of the speed of these two ions is $2v_1$, $$2v_1 \cdot \frac{L}{v_0} = \delta \qquad (2)$$

or $$\frac{2v_1}{v_0} = \frac{\delta}{L}$$

This equation enables one to determine the required buncher voltage (i. e., the amplitude of the sawtooth wave applied to the buncher) when, considering the action of the buncher as hereinafter explained, it is desired to bunch the ions in a distance L, which is also referred to as the "tube length" or the "segregation distance." If a collecting electrode is placed at this distance from the buncher, the current received by it will be "infinite" during an "infinitesimal" portion of each cycle and zero during the remainder of the cycle.

The ideal wave form, as has been noted, is the sawtooth but difficulties inherent in the production of such a wave at the frequencies and amplitudes desired compel the employment of synthesized forms. Thus for example for certain applications, a simple sine wave form can be tolerated. For others, a combination of a fundamental and certain harmonics thereof is useful in accomplishing the desired grouping or modulation. Thus the alternating field established at the buncher electrode can be varied in form, frequency, amplitude or the like depending on the particular operation for which the invention is employed.

To illustrate imperfect bunching by other wave forms than the sawtooth suppose that the velocity modulation is sinusoidal, so that an ion that leaves the buncher at time $t$ has a velocity given by $$v = v_0 + v_1 \sin 2\pi ft \quad (v_1 \ll v_0) \qquad (3)$$

and that the analyzer or focusing-deflector electrode is a distance along the beam from the buncher. This same ion arrives at the analyzer at a time $\tau$ given by $$\tau = t + \frac{L}{v_0 + v_1 \sin 2\pi ft}$$

since the second term in this equation is just the transit time. Furthermore, since $v_1$ is small compared with $v_0$ the fraction can be expanded as a Taylor's series in powers of $$\frac{v_1}{v_0} \sin 2\pi ft$$

which gives $$\tau = t + \frac{L}{v_0} - \frac{Lv_1}{v_0^2} \sin 2\pi ft \qquad (4)$$

For the purpose of later discussion, assume that the center of a bunch is just leaving the buncher at time $t=0$. The center of this same bunch reaches the analyzer at time $$\frac{L}{v_0}$$

It is further convenient to introduce the quantity $$\theta = 2\pi ft \qquad (5)$$

which is the phase at which a particular ion leaves the buncher, referred to the center of the bunch; and the quantity $$\phi = 2\pi f + 2\pi f \frac{L}{v_0} \qquad (6)$$

which is the phase at which the ion arrives at the analyzer, also referred to the center of the bunch. Equation 4 then becomes $$\phi = \theta - \frac{2\pi fLv_1}{v_0^2} \sin \theta \qquad (7)$$

It is desirable to know the wave form of the beam current as it reaches the analyzer. This wave form should be sharply peaked with almost no current between the peaks, for good bunching. The charge leaving the buncher in an interval $dt$ at time $t$ is $i_0 dt$ where $i_0$ is the (unvarying) beam current leaving the buncher. This same charge enters the analyzer during a corresponding interval $d\tau$ at time $\tau$. So if $i(\theta)$ is equal to the current arriving at analyzer at phase $\phi$ (given by Equation 6), $$i_0 dt = i(\phi) d\tau$$

or $$i(\phi) = \frac{i_0}{\frac{d\tau}{dt}} \qquad (8)$$

by (4) and (5)

$$\frac{i_0}{i(\phi)} = 1 - \frac{2\pi fLv_1}{v_0^2} \cos \theta \qquad (9)$$

To obtain the desired result—the current $i$ as a function of phase $\phi$ at the analyzer—it is necessary to eliminate $\theta$ from Equations 7 and 9. This can be done graphically, since Equations 7 and 9 are the parametric equations of a cycloid. Specifically, if we plot $\phi$ (Equation 7) as abscissa, and $$\frac{i_0}{i}(\phi)$$

Figure 5:
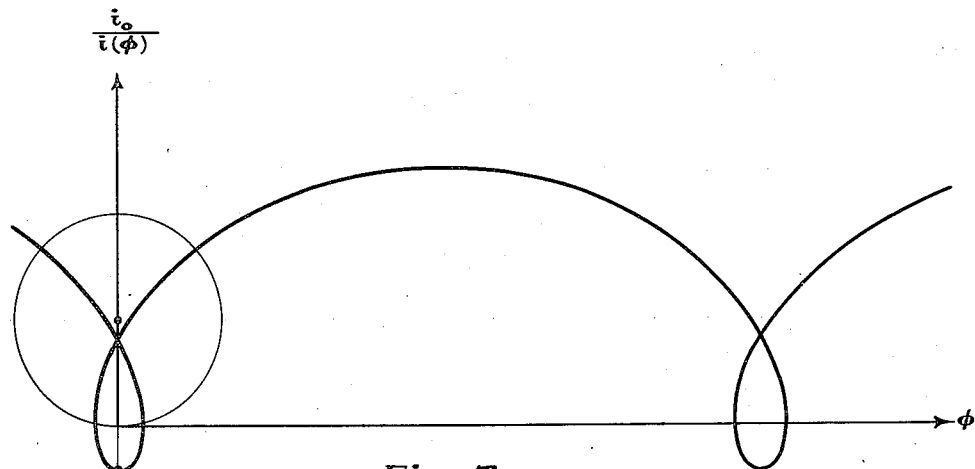
Figure 5A:
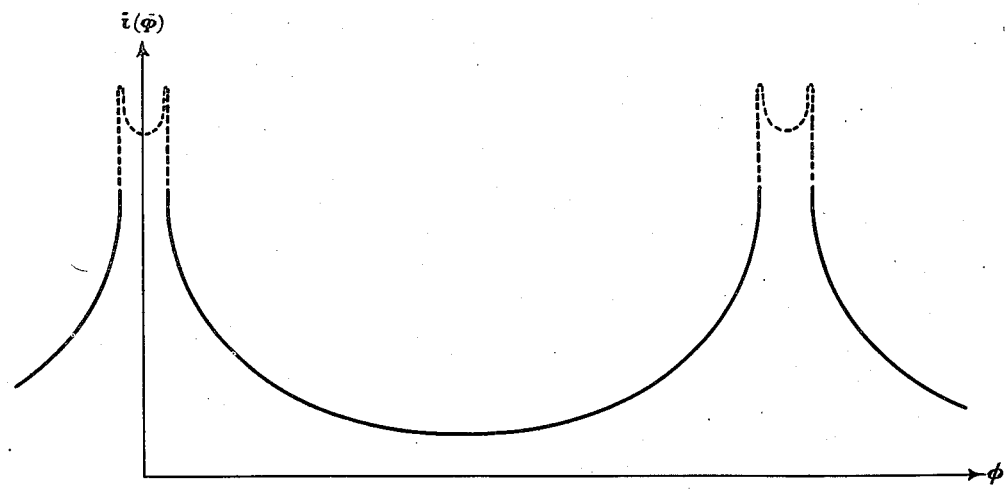

(Equation 9) as ordinate, we get the curve which is traced out when a circle of unit radius rolls, as a wheel, along the axis and carries a tracing point on it at a radial distance $$R = \frac{2\pi f L v_1}{v_0^2} \quad (10)$$

from its center. Several such curves are shown in Figures 3, 4 and 5. To obtain $i(\phi)$ it is only necessary to divide $i_0$ by the ordinates of this curve. The results are shown in Figures 3a, 4a and 5a. In the region between the two peaks of Figure 5a, the total current is the sum of three parts, since in this region of phase a vertical line intersects the curve of Figure 5 in three points.

From many points of view the best bunching occurs if the tracing point lies on the circumference of the rolling circle, as in Figure 4. Since the circle has unit radius, the radius R at which the tracing point is located must also be unity, or, from Equation 10:

$$\frac{2\pi f L v_1}{v_0^2} = 1 \quad (11)$$

Since again the bunch distance $\delta$ is $$\frac{v_0}{f}$$

this gives $$\frac{2v_1}{v_0} = \frac{\delta}{\pi L} \quad (12)$$

which may be used to determine the required buncher voltage for sine wave bunching, and may be contrasted with Equation 2.

Sine wave bunching is at best imperfect, since even in Figure 4a this current is not completely concentrated at one point of the cycle, but it does not require such high peak voltage or difficult wave forms as sawtooth bunching. In some designs as has been mentioned a compromise can be made by using a fundamental sine wave together with one or two harmonics thereof, amplitudes and phases being so adjusted as to get an approximation to a sawtooth.

Figure 6 is a schematic representation of an assembled mass separation device of the linear type constructed according to the principles of the present invention and diagramatically indicates the application of various potentials to the elements of the assembly in order to accomplish the separation operation. This type of device has become known as an "isotron" based upon its utility for large scale isotope separation and the complete assembly is also sometimes referred to as an "isotron tube." As may be seen with reference to the drawing, the isotron tube comprises an ion source 101, the housing of which is maintained at a high positive potential (by supply 100) with respect to the metal tube 102 and in subatmospheric, sealed relationship with the tube, but electrically insulated from it by the quartz collar 103. Positive ions from the source 101 are accelerated in a beam (direction of which is indicated by the arrow or arrows designated by the letter B in the drawings), by the difference in the potential between the source screen assembly 104 (which is at the source potential) and the first grid of the buncher electrode 105. Since this grid is at ground potential as is the tube 102, effectively it is negative with respect to the screen assembly 104 and acceleration of the ions produced in the source 101 results in the space 106. By reason of this difference in potential it has also been found that electrons emitted in the operation of the source are prevented from escaping therefrom and consequently their effectiveness in producing ions in the source is increased and space charge effects are reduced. Upon being accelerated through the potential fall as above described, isotope separation is then initiated by bunching the ions in the beam according to their masses (and, as will be explained hereinafter, according to the charge as well).

This process may be readily seen from the following considerations, taken together with the general description of the bunching of particles of a single mass and charge given above. Assume that the beam contains ions of two masses denoted by subscripts 1 and 2 and that the ions are all singly charged. The velocities imparted by the accelerating voltage (between the source screen assembly 104 and the first grid of the buncher electrode 105) denoted by $V_s$ are $$v_{01} = \sqrt{\frac{2eV_s}{m_1}}$$

$$v_{02} = \sqrt{\frac{2eV_s}{m_2}} \quad (13)$$

where $m_1$ and $m_2$ are the masses of the two materials being separated and $e$ is the charge. More exactly, the centers of gravity of the respective bunches will move with these velocities. In order to effect the maximum amount of separation between the materials, it is desirable to have the two kinds of ions arrive at the analyzer or focusing-deflector electrode 108, a half cycle out of phase. The number of cycles required by a particular bunch to move through the distance L is the frequency multiplied by the time required or $$\left(\frac{L}{v}\right)f$$

Then $$\frac{Lf}{v_{01}} - \frac{Lf}{v_{02}} = \frac{1}{2}$$

and, therefore, $$L = \frac{1}{2f} \frac{\sqrt{2eV_s}}{\sqrt{m_1} - \sqrt{m_2}} \quad (14)$$

Thus L is then seen to be the distance along the beam at which the heavy bunches have fallen back and occur just midway between the light ones, and for ideal operation this distance L should be the distance between the buncher electrode and the analyzer electrode. The analyzer, the design and operation of which will be discussed hereinafter in greater detail, is actuated at a frequency such that when a group or bunch of light ions arrive at this point in the isotron tube, they are permitted to pass through the analyzer electrode into a suitable collector, for example, of the Faraday type, but when the bunch of heavy ions arrives at the analyzer they are deflected into a separated zone. The variation with time of the currents arriving at the analyzer is shown schematically in Figure 7 and the interval during which the analyzer transmits ions to the collector is indicated by $\Delta t$.

It should be noted at this point that the analyzer or focusing deflecting electrode 108 spaced at the distance L from the buncher accomplishes a dual purpose. First, it focuses the ion beam by reason of the direct current potential applied to the plates of the electrode from the power source 109 and second, by the use of an alternating current potential applied to the plates from power source 111 at a frequency bearing a fixed relationship to the impressed voltage applied to the buncher electrode it deflects undesired ions from the slit of collector 110. The direct current focusing potential is supplied through an extremely flexible circuit so that the potential supplied to each plate can be varied independently of the others in the analyzer and the potential of all the plates can be varied so that the ratio between them is maintained constant. This is accomplished by the variable line resistor 240 and the individual variable resistor arrangement shown by the resistor 241.

It is apparent that the usefulness of the isotron for isotope separation depends on two quantities, the efficiency $\eta$ and the separation factor $\alpha$. The efficiency $\eta$ is the fraction of the total of the desired ions in the beam which are actually collected and is therefore equal to the shaded area indicated in Figure 7 divided by the corresponding area of the lower curve for an entire cycle. The separation factor $\sigma$ is the ratio of the number of desired ions to the number of undesired ions transmitted to the collector divided by the corresponding ratio in the original beam.

The first of these ratios is $$\frac{\text{average of light current wave during interval } \Delta t \text{ near its maximum}}{\text{average of heavy current wave during interval } \Delta t \text{ near its minimum}}$$

The second ratio is $$\frac{\text{average light current during entire cycle}}{\text{average heavy current during entire cycle}}$$

Since the two curves of Figure 7 are the same except for the half-cycle displacement and for the different vertical scales, we get, on dividing the first ratio by the second $$\sigma = \frac{\text{average of either curve during interval } \Delta t \text{ near maximum}}{\text{average of same curve during interval } \Delta t \text{ near minimum}} \quad (15)$$

This makes it possible to determine $\sigma$ from purely electrical measurements, where the measured current consists predominantly of heavy ions during the entire cycle. This is done by shifting the phase of the analyzer voltage gradually and calculating $\sigma$ as the ratio of the maximum and minimum values through which the collected current goes. In a few cases, the separation factors have been measured by actual isotopic analysis of the collected material, and the results agree reasonably well with the electrical determinations.

From the definition of efficiency and Equation 15 it will be seen that to obtain high efficiency $\Delta t$ should be a large fraction of the cycle, but to obtain a high separation factor $\sigma$, $\Delta t$ should be a small fraction of a cycle. Generally, increased efficiency can be obtained only at the expense of a decreased separation factor, and vice versa; the balance between these factors being arrived at upon consideration of the particular separation operation.

If $\Delta t$ is made very small, Equation 15 becomes $$\sigma = \frac{\text{maximum of either curve (Figure 7)}}{\text{minimum of same curve (Figure 7)}} \quad (16)$$

This is the maximum obtainable separation factor (reached at substantially zero efficiency) for the given type of bunching.

If bunching were perfect, one could, of course, obtain an infinite separation factor at 100% efficiency by simply choosing $\Delta t$ anywhere between zero and a half cycle, thus transmitting the entire desired content of the beam and none of the undesired content.

To return to the bunching process it is generally preferred to arrange the buncher electrode as a plurality of permeable current conducting members called screens or grids, in the ion beam path. Permeable, as used here, is meant to indicate that the ion beam can pass through the member without substantial interference therefrom and that the said beam will be influenced in the desired manner by the potentials applied to the member. These members may be in the form of screens or grids (that is, a plurality of meshed wires or separate wires supported parallel to each other). These grids are usually plane although it is not intended to limit the present invention to the plane form since curved grids are useful in particular applications.

The simplest method for accomplishing the bunching operation would be to combine it with the accelerating operation effected by the accelerating voltage applied at or near the source. For example, since it has been generally found preferable to accelerate the ion beam upon emergence from the source by causing it to pass through a sequence of grids of which the first, designated as the source screen, is at substantially the potential of the arc plasma and the second, at a high negative potential relative to the first, for drawing out and/or accelerating the ions; the alternating current bunching voltage or R. F. voltage can be simply superposed on the direct current accelerating voltage and applied through suitable circuits to the accelerating grid. In this manner the desired velocity modulation of the ion beam can be accomplished, but since it in effect capacitively couples the entire tube and associated apparatus into the R. F. circuit, this method has not been found desirable. A preferred method is to apply a direct current potential alone to the accelerating grid and additional grids are provided through which the alternating current is applied. The latter grids are called the buncher grids and the combined assembly of buncher grids is designated herein as the buncher electrode. In arranging the buncher grids it is necessary that they be spaced so that a net change of energy of an ion passing therethrough effects a velocity modulation thereof.

Generally the applied R. F. voltage in its most desirable form, is a sawtooth wave. However, this is not essential, and it has generally been found possible to accomplish the bunching by employing an R. F. voltage made up of a fundamental frequency and one or more harmonics thereof. The net energy change possessed by the ions emerging from the buncher electrode therefore, also generally contains a fundamental and several harmonics, the result being an approximation of a sawtooth energy curve for ions so influenced (see Figure 2). It is then possible to determine the efficiency of a buncher from a relationship of the form:

$$\eta_N = \frac{E_N}{eV_N} \quad (17)$$

in which $\eta_N$ is the efficiency at the $N^{th}$ harmonic, $V_N$ is the amplitude of the $N^{th}$ harmonic of the applied R. F. voltage and $E_N$ is the amplitude of $N^{th}$ harmonic of the resulting energy change of the ions, $e$ is the charge of the ion. In the usual complex (or vector) representation of alternating current quantities $\eta_N$ will be real only if $E_N$ and $V_N$ are in phase. Thus for a simple form of three grid buncher the gap between grids being substantially equal $$\eta_N = \frac{2}{\pi N d} \cdot \sin^2\left(\frac{\pi N d}{\delta}\right) \qquad (18)$$

It is also generally desirable that the amplitudes and phases of the various components $E_N$ of the energy change be adjusted to approximate a sawtooth wave form, since if the velocity $v$ of the emergent ions is to vary as a large constant part plus a superposed sawtooth variation, the energy $\tfrac{1}{2}mv^2$ of the emergent ions must also vary as a large constant part plus a small sawtooth variation. The amplitude and phase of the $E_N$ components are, therefore, fixed by the requirements of optimum bunching, and if the values of the $\eta_N$ are known, required amplitudes and phases of the components $V_N$ of the applied R. F. voltage can be determined. It is not necessary to resort to the use of formulas to produce electrodes designed for optimum bunching and in practice in the operation of the isotron, the amplitudes and phases of the R. F. components may be adjusted by trial and error to effect the desired result. However, it is important in designing an electrode comprising a plurality of grids to accomplish bunching of an ion beam to insure that $n_N$ is not inconveniently small for any harmonic that is to be used. Furthermore, since the mass separating device of this invention can be constructed to effect separation simultaneously of singly, doubly or triply charged ion bunches, certain relations between the efficiencies for the various types of ions must be observed. The restrictions imposed by these requirements on buncher electrode design will now be discussed. In the formation of ions in an electric discharge type of ion source such as is generally used with the device of this invention, the degree of ionization cannot be economically controlled. Therefore, in the ion beam, singly, doubly or triply charged ions of the various isotopes in the beam will be encountered. Ions of different charge will receive different acceleration and bunching energy and ions of different mass, even if they have the same charge, will travel down the tube with different velocities. Furthermore, ions passing through the buncher electrode at different speeds are differently affected so that the different ions will receive different buncher energies.

Assume that only singly and doubly charged ions are present in the beam. The doubly charged ions will be accelerated to twice the energy and hence $\sqrt{2}$ times the velocity received by the singly charged ion. This means that the distance travelled in one period of oscillation of the voltage (commonly called the bunch distance) is $\sqrt{2}$ times greater for the doubly charged ion than for the singly one. It is apparent from the discussion above that the efficiency of any particular buncher for a particular kind of ion (i. e., the ratio of the voltage or energy per unit charge received by the ion, to the voltage put on the buncher electrode) depends on the velocity of the ion through the buncher and consequently on the bunch distance. It is thus apparent that the efficiency of the buncher would be different for the singly and doubly charged ions. Furthermore, this dependence of the buncher efficiency on bunch distance will change as the dimensions of the buncher are changed, which makes possible the fact that for a given type of buncher the selection of the dimensions can be accomplished so that both singly and doubly charged ions simultaneously receive the proper bunching voltage.

To accomplish the separation then, of isotopes, when differently charged ions are present in the beam, two conditions must be fulfilled; first, the centers of the light ion bunches (each bunch being a group of differently charged ions), must arrive at the analyzer practically simultaneously. The heavy ion bunches can then be made to follow moderately well between the light ion bunches; and second, each kind of ion must be reasonably well bunched when it reaches the analyzer, that is, as to isotope and as to charge.

It is noted above that the doubly charged ion travels down the tube with a speed $\sqrt{2}$ times that of singly charged ion or about 41% faster. The distance L from the buncher to the analyzer is generally from fifty to one hundred times the bunch distance $\delta$ and therefore a given doubly charged ion bunch will overtake and pass many singly charged bunches on its way down the tube. Synchronism through the analyzer thus can be accomplished by placing the analyzer at any one of the many points where the doubly charged ion bunches are just passing through the singly charged bunches. It is also found that at a certain few of these points within the limits imposed for good bunching (i. e. $100\delta > L > 50\delta$) triply charged ion bunches of the same isotrope will arrive in synchronism with singly and doubly charged ions. Two such points for example are given by $$L = 92.2\delta$$
$$L = 54.6\delta \qquad (19)$$

in which $\delta$ denotes the bunch distance for a singly charged ion. It should be noted that the values of L given are for a particular isotope separation operation (the separation of uranium 235 from uranium 238). For isotopes or materials having some other relative mass difference, some other triple coincidence points may be more advantageous since the value of L used or the limits thereof, should be equal to or somewhat less than the value given by Equation 14.

To calculate values of L leading to coincidences of the type mentioned, the times required for the variously charged ions of a particular mass to move a distance are determined using the following equation for the velocity $v_0$ imparted to an ion by the accelerating voltage $V_s$ $$v_0 = \sqrt{\frac{2eV_s}{m}} \qquad (19a)$$

in which $e$ and $m$ are the charge and mass respectively. Having determined these times the assumed value of L is adjusted for example by trial and error procedures until these times differ by integral multiples of a cycle of the impressed radio-frequency buncher potential.

As noted hereinbefore, it is necessary not only that the centers of bunches arrive in synchronism at the analyzer but also that these bunches be well formed at that point. If space charge can be neglected, this means that the percentage velocity modulation should be the same for differently charged ions.

In order to arrive at the most satisfactory solution since the length of the tube and the accelerating voltage is the same for all ions regardless of the charge, it is desirable to make the bunching voltage acquired by each ion (e. g. $E^+$ and $E^{++}$ for the singly and doubly charged ions respectively) proportional to its velocity and hence to its bunch distance ($\delta^+$ and $\delta^{++}$ respectively). That is the proportion $$\frac{E^{++}}{\delta^{++}} = \frac{E^+}{\delta^+} \qquad (20)$$

must hold. The wave form received by each kind of ion must be the same and the amplitudes of these waves must be in the ratio of their bunch distances. As a result the efficiencies ($\eta^+$ and $\eta^{++}$) of the buncher for singly and doubly charged ions must have the relation $$\frac{\eta^{++}}{\delta^{++}} = \frac{\eta^+}{\delta^+} \qquad (21)$$

or written another way $$\frac{\eta^{++}}{\eta^+} = \frac{\delta^{++}}{\delta^+} = \sqrt{2} \qquad (22)$$

It is then apparent that for a given type buncher the dimensions must be chosen to satisfy Equation 22. For example, in the case of the three grid bunchers for which Equation 18 evaluates the efficiency for the $N^{th}$ harmonic of a sine wave. Assume the case of the fundamental harmonic $N=1$, then the Equation 18 becomes $$\frac{\eta_1}{\delta} = \frac{2}{\pi d} \sin^2 \left( \frac{\pi d}{\delta} \right) \qquad (23)$$

If $$\frac{\eta_1}{\delta}$$

is plotted against $$\frac{d}{\delta}$$

holding $d$ fixed and varying only $\delta$ and because $$\frac{d}{\delta^+} = \sqrt{2} \, \frac{d}{\delta^{++}} \qquad (24)$$

two points must be obtained on this graph with the same ordinates $$\frac{\eta_1}{\delta}$$

but with abscissae $$\frac{d}{\delta}$$

in the ratio of $1 : \sqrt{2}$. In this particular case it will be found that this condition is fulfilled by points with abscissae $$\frac{1}{1+\sqrt{2}}$$

and $$\frac{\sqrt{2}}{1+\sqrt{2}}$$

Thus given $\delta^+$ (which is determined by the accelerating voltage and buncher frequency) the spacing $d$ is determined by $$\frac{d}{\delta^+} = \frac{\sqrt{2}}{1+\sqrt{2}} = 0.586 \qquad (25)$$

It should be noted that with this manner of choosing $d$ the relation in Equation 21 holds for the higher harmonics (i. e., $N$ greater than 1) also.

The phenomenon of space charge has been mentioned above. Under high production requirements, which necessitates the employment of high beam currents, this factor becomes increasingly important, and to a certain extent governs the choice of dimensions of the separate components and their spacing relative to one another.

With no negative ions present, two effects due to the mutual repulsion of the positive ions of the beam are apparent. First, this repulsion would cause a spreading or defocusing of the beam as it proceeds down the tube; and, second, it would oppose the bunching of the ions in discrete groups according to mass and charge. The first effect has not been found to any great degree in practice. In the operation of the device there has been sufficient balance or neutralization of the effect by negative ions (possibly electrons) present in the field-free space between the buncher and analyzer electrodes. It is possible that this neutralization is connected with the bombardment of residual gases in the tube by the accelerated positive ions.

However, if negative ions are present and help neutralize the space charge to overcome defocusing, there is no tendency to bunch the negative ions with the positive ions with the result that mutual repulsion of the positive ions is fully operative to oppose bunching or to cause "debunching" just as would be the case in the complete absence of the negative ions.

If the ion beam is limited to one kind of ion the phenomenon is quite simple. If the bunching wave is a sawtooth of just the right amplitude to give perfect bunching for such low beam currents that mutual repulsion can be neglected, then for higher beam currents the bunches will still have a certain thickness when they reach the analyzer. There are now two main alternatives. Either the bunches have passed through a condition of minimum thickness before reaching the analyzer and are now spreading out again because of mutual repulsion, or they are still contracting when they reach the analyzer (they are contracting less rapidly, of course, than when they started, since the mutual repulsion of the ions has slowed down their relative motion toward one another). If the beam current lies below a certain critical value, given below, the second alternative prevails and the bunches are still contracting when they reach the analyzer. In this case, it is possible by simply increasing the sawtooth voltage on the buncher, to compensate for the repulsion and make the ions bunch perfectly at the analyzer in spite of their mutual repulsion. But if the beam current is above the critical value the first alternative prevails and the bunch thickness passes through a minimum value at a point intermediate between buncher and analyzer. In this case, it is impossible to obtain perfect bunching at the analyzer, since increasing the bunching voltage first causes perfect bunching at the intermediate point. The ions cross through the bunch to the opposite sides at this point and any further increase in buncher voltage will simply cause them to separate more rapidly after passing through the point of perfect bunching.

It is clear that this difficulty can be alleviated somewhat by placing the analyzer closer to the buncher. This fact will be apparent from the formula for the critical current value, which shows that larger currents can be tolerated if the distance $L$ between analyzer and buncher is decreased. The formula gives the critical value of the current density in the beam (it is this, of course, rather than total beam current that determines the space charge density):

$$j = \frac{19{,}130\, V_s^{\frac{3}{2}}}{L^2} \sqrt{\frac{e}{m}} \quad (26)$$

wherein:

$j$ = current density in microamperes/cm².
$V_s$ = accelerating voltage in kilovolts
$L$ = buncher analyzer distance in cm.
$e$ = charge on ion in electronic charges
$m$ = mass of ion in atomic mass units In order to be able to use high beam currents without exceeding this limit, the isotron should be designed for high voltage $V_s$ and short distance $L$, and therefore, also for a high frequency $f$, since Equation 14 must also be taken into consideration.

In the interest of high beam currents, it is feasible to use a somewhat (but not greatly) shorter length $L$ than the value given by Equation 14. If this is done the light-ion bunches will not be midway between the heavy-ion bunches when the analyzer is reached, but will be closer to the heavy-ion bunches behind them. The increased difficulty of separation may be a sacrifice worth making in the interest of increased quantity of material produced.

In the discussion leading up to Equation 26 only one kind of ion was considered. When ions of two different masses (e. g., isotopes of a given element) are considered and it is assumed that ions of one mass, say the heavier, greatly predominate in numbers, the foregoing considerations will still apply to the heavy ions, but we must also examine what happens to the lighter ones. A given light ion is affected principally by the space charge of the heavy ions, while the space charge of the other light ions, because the light ions are very few in number, is of minor importance. The light ions are also affected by the fact that an overvoltage is applied to the buncher in order to obtain sharp bunching of the heavy ions. Calculation on this basis shows that the light ions are bunched a little too soon; that is, at a point a little in front of the analyzer, and that even at this point the bunches are not perfectly sharp, being spread out somewhat by the disturbing influence of heavy ion bunches. However, if the limitation (26) is not exceeded, these effects are not serious. This is borne out by experiment.

Having accomplished the segregation of the different masses in the ion beam, and keeping in mind that the charge carried by each ion affects the procedure, separation of the materials according to mass is accomplished by passing the beam through the analyzer electrode. In the simplest case, separation of the segregated masses can be accomplished by passing the beam between a pair of parallel plates which are connected to a source of radio-frequency potential. The spacing between these plates should be substantially less than the bunch distance in order that the bunches passing therebetween are completely acted upon by the potential applied to the plates. It is obvious then, that such an apparatus can only be used in connection with very narrow beams. In this type of arrangement, the bunches of desired isotopes are permitted to pass between the plates in an undeflected manner, that is, when the potential on the plates is zero, whereas when the undesired ions pass between the plates they are deflected so that they do not pass into the collecting zone for desired ions, the deflection being caused by the potential applied to the plates.

Where, however, large ion currents are employed it has been found desirable to have the beam focused to either a single point or a plurality of points in order to minimize the amount of remixing which would occur if the entrance aperture of the collecting zone was broad and furthermore, since the undesired ions must be deflected away from the entrance aperture of the collector without using reasonably large potentials deflection may be accomplished by passing the beam through a plurality of plates spaced apart a predetermined distance, and these same plates can be used for focusing the beam. It is possible in effecting this separation step to employ a direct current focusing potential which acts through a plurality of current conducting members spaced apart in the beam and to effect deflection of the undesired ions by the application of a suitable alternating current to these same plates of proper frequency and phase relation to the R. F. potential applied to the buncher. For example, with a direct current potential applied to the plates in the proper manner, the beam or a portion thereof will be focused to a spot. Now, if the alternating current potentials applied to successive plates are made opposite in sign the beam is split into two components since half the gaps in the total field is in a direction opposite to what it is in the other half. Separation is then made by applying an alternating voltage at half the buncher frequency such that at zero voltage the undesired ions are collected by being undeflected and passing through the entrance aperture of the collector, whereas at maximum alternating voltage the undesired ions are deflected to either side of the aperture. Alternatively a similar result may be obtained by applying a direct current voltage to the plates equal to the alternating voltage amplitude and instead of applying a half frequency wave to the plates to accomplish deflection of the undesired ions, an alternating potential at the same frequency as the buncher potential is employed. It is advantageous to use in conjunction with such a series of conducting members in an analyzing electrode, a suitable grid or screen in advance thereof in relation to the beam to prevent the direct current fields penetrating into the preferably field-free zone between the buncher and analyzer, and thus slowing up the ions in such a way that there is an appreciable variation across the beam at the time that the ions reach the analyzer. In arranging the direct current potentials on the analyzer plates in order to bring the beam or a portion thereof to a focus point, it is clear that no matter how the potential on the plates is arranged, all of the ions passing between the same pair of plates will suffer the same deflection, if there are no charges in the paths of these ions. Thus the width of the focus will necessarily be at least the same as the distance between the plates. The focusing can be achieved within this limitation as follows: the beam through the central path of plates will go through undeflected and negative potentials are applied to the plates outward of this center set increasing with the distance from this center to accomplish the desired result. In practice, the focusing operation is most easily accomplished by trial and error, with the voltages applied to each successive set of plates outward of the center set being adjusted in a manner which will be described in detail hereinafter. If the undesired ions so predominate over the desired ones as is the case in the separation of the uranium 235 isotope (desired) from the uranium 238 isotope (undesired) that the desired bunches are not directly observable but are known to occur approximately halfway between the undesired ones, the phase of the analzyer R. F. is simply adjusted until the collected current measure at the collector is at a minimum, for actual collection of the desired ions. This may be accomplished by means of a phase-shifting network through which the analyzer and buncher radio-frequency potentials are suitably synchronized. Since the specific design and construction of these phase-shifting networks is not part of the present invention, a detailed discussion thereof is not deemed necessary beyond that given hereinafter in the description of an illustrative embodiment of the isotron tube. It should be noted that if the amplitude of the radio-frequency applied to the analyzer is increased, the motion of the beam or rather the movement of the focus of the beam is accelerated so that the beam swings past the collector aperture moving rapidly, and shortens the interval during which the ions are collected. This increases the separation factor but decreases the efficiency (both as hereinbefore defined) and the balance must be determined, based upon the requirements of the particular operation. Furthermore, it has been found desirable to limit the dimensions of the plates and the positioning thereof so that they are not spaced more than one-third of their width apart and their width should be substantially less than the bunch distance $\delta$. These conditions may be readily determined by one skilled in the art upon consideration of the nature of the fields created and the time factors involved.

In order to illustrate the incorporation of the novel material separation principles of the invention in a physical embodiment, apparatus constructed for the separation of uranium isotopes will be described. In view of the facts that the ratio of the mass, the two isotopes concerned, uranium 235 and uranium 238 is very nearly unity, and the desired isotope 235, is normally found in a concentration of one part in 140 parts of normal polyisotopic uranium, the utility of the methods and apparatus for practically any materials is amply demonstrated.

Referring to Figures 8 and 9 which are two views of an assembled device constructed in accordance with the principles of this invention and in which the same reference characters are used to designate similar parts referred to in other portions of this description, the main tube 102 is constructed of cylindrical brass tubing having an outside diameter of about twelve inches and a wall thickness of about three-sixteenths of an inch. In order to facilitate the assembly of the various elements in the tube, sectional tubular construction is preferred, the various sections being flanged at either end to afford means for forming an airtight seal. For example, the flanges 112 and 113 have a plurality of aligned holes drilled in them to accommodate bolts (not shown). A gasket collar 114 which has annular recesses machined into both flat surfaces adapted to fit snugly against the wall of the tube, and drilled holes therethrough aligned with those of the flanges 112 and 113, may then be placed in position, the bolts inserted through the passages thus provided, and an air-tight joint completed by tightening nuts which cooperate with the bolts.

Similar or rather equivalent construction is used in the assembly of the ion source, generally designated as 101, in sealed relationship with the main body of the tube yet electrically insulated therefrom. The source includes water cooled electrodes 115 and 116 which strike an arc with filaments, not shown, maintained above and below the tungsten grid 117 upon which material to be ionized rests. The metallic material undergoing separation is fed by means of an automatic feeder mechanism from a supply of such material maintained in the vertical evacuated storage magazine 118. The feeder mechanism may be electrically controlled to operate upon a change in arc voltage such as takes place when the amount of material being ionized in the arc falls below a predetermined value. The movement of the feeder rod 119 which is activated by compressed air, cuts off a portion of the supply of material (i. e., which projects into the feeder tube under the force of the weight 120) and feeds it to the tungsten grid which acts as a support during the vaporizing step. Limit switches 121 and adjustable stops 122 are used to control the movement of the feeder rod and thus control the position in which the metallic material is deposited on the tungsten vaporizing grid.

The metallic source housing is insulated from the tube by mounting and sealing it in a supporting collar 103 made of quartz which has been found to be best because of its ability to resist heat created in the source. The collar is then drawn up into sealed relationship with the tube by means of bolts through cooperating flanges as explained above.

The source screen assembly 104 which for convenience is called the accelerating electrode (although as has been explained acceleration is effected by the potential difference between the screen and the first buncher grid) is maintained in the opening of the source housing 101 at the end extended inwardly of the tube 102. Referring now to Figures 10 and 11 wherein greater details of the construction may be seen, the screen 123 is made of tungsten wire about forty thousandths of an inch in diameter and with about twenty meshes per square inch, and is supported in the rectangular opening defined by the steel masking plate 124, which serves initially to outline the beam of ions formed in the source 101. In order to prevent buckling of the screen, or other deviation from a position perpendicular to the ion beam, due to expansion or the like, the screen is mounted under constantly applied tension through the use of a multiplicity of springs 125 which are set obliquely in the pivotally movable supporting blocks 126, and wires 127 which extend from the springs, to the periphery of the screen 123. Screws 128 which extend through slots in the supporting blocks and are threaded into the masking plate, are used to adjust the tension on the screen 123. For example, in order to put more tension on the screen 123 after it is in position and the wires 127 attached to the springs 125, it would only be necessary to turn the screws 128 inwardly causing the block 126 to pivot at its wedge shaped end thereby moving the springs in an arc and drawing outwardly on the wires 127.

When the screen or accelerating electrode 123 has been stretched in position on the masking plate 124 the shield plate 129 is then fixed in spaced relationship with the masking plate 124 by means of the copper spacer studs 130. The shield plate is held in position defining the end of the source housing 101 by screws which engage threaded openings in the annular brass ring 131 soldered to the inside of the housing.

Another source screen or accelerating electrode assembly which has been found useful is shown in Figures 10a and 11a. The difference between this accelerating electrode and the one described immediately above is in the screen support and the manner of application of tension to the screen. The screen 132 in this type is also fabricated of tungsten wire about forty thousandths of an inch in diameter woven into a rectangular screen having about twenty meshes to the inch. A multiplicity of tension wires 133 are attached to the perimeter of the screen at about one-half inch intervals. The tension wires 133 are firmly attached at their outwardly extending ends to the springs 134. The supporting frame 135 has notches 136 cut therein to accommodate the wires 133 and is made integral with the circular brass mask plate 137 by means of screws which engage threaded holes in the rectangular spring supporting blocks 138. The springs 134 are rigidly mounted in the blocks 138. Now when the screen is in place and wires 133 are drawn through the notches and attached to the springs 134 tension can be applied to the screen in such a manner that even under high temperature conditions buckling of the screen is avoided although the flexible adjustable feature of the supporting and tension structure previously described with reference to Figures 10 and 11 is absent.

The spaced relationship of the screen 132 and the brass shield plate 139 is maintained by the tubular spacer 140 which is hard soldered to the shield plate or otherwise made integral therewith, and attached to the mask plate 137 by means of screws 141. Assembly of the accelerating structure in the source unit is accomplished by screws 142 which extend through the shield plate 139 and which engage threads in the stiffener ring 143 soldered to the source housing.

As is indicated above, it has been shown by calculation and empirically that it is possible to form the ion bunches in many ways. For example, the ions may have their velocities modulated by having the source of the ions vary in potential relative to the tube down which they travel. However, since a great number of electrical leads are necessary for the operation of the source arcs and the R. F. voltages must be prevented from reaching ground through these leads, the filters required and the source capacity indicate the use of a separate buncher unit is preferred. So, too, variations exist in the separate buncher unit as for example, the ions may be given an energy which has the same wave form of the applied voltage, while in others this relation is not maintained.

The buncher electrode shown in Figures 12, 13 and 14 nominally consists of three separate elements. The first element is a graphite grid 145 made by arranging parallel vertical strips of graphite in a plane perpendicular to the beam axis. As noted above, this grid is effectively negative with respect to the source screen 104 and thereby acts with the screen to accelerate the ions produced in the source. Graphite strips of the type mentioned are preferred because being the first grid interposed in the accelerated beam the strips are subjected to considerable ion bombardment. These strips then act as protection for the two tungsten wire grids 146 and 147 which are arranged according to the formulas set out hereinbefore at predetermined distances from the graphite grid 145 and each other substantially in the "shadow" of the strips of said graphite grid.

It is desirable to have the space (in the direction perpendicular to the beam) between the strips as wide as possible since this will increase the transparency of the buncher and fewer ions will be stopped by hitting the electrodes. However, the distance cannot be made too large for the reason that ions going through the buncher close to one of the plates receive a different energy than those going through half way between the strips resulting in bunching to a different extent going down the tube (i. e. the pattern in Figure 1 will not be followed). The further the strips are apart, the greater is this difference in energy.

Turning now to the structure chosen to illustrate the general principles hereinbefore stated three supporting frames, 148, 149 and 150, are maintained in nested spaced relationship in the tube at the predetermined distance from the screen electrode 104 previously described. Grid 145 supported by frame 150 comprises graphite strips which are about eight inches long by about five-sixteenths of an inch wide and three thirty-seconds of an inch thick. These strips are machined to about three-sixteenths of an inch in width at each end to permit them to project into the rectangular opening of the copper shield plate 151. Wire hooks 152 are passed through holes in the ends of the graphite strips and are used in conjunction with the springs 153 to suspend the multiplicity of strips in vertical parallel relationship as is more clearly shown in Figures 12 and 13. It should also be noted that the strips present their smallest dimension for the beam, the wide surfaces of successive strips being in adjacent positions. The springs 153 may be bronze, beryllium, copper or other suitable materials and are securely attached to the grid support 150 by means of screws 154.

The grid support 150 is spaced from the copper buncher shield plate 151 by the copper spacer studs 156 thus permitting accurate positioning of the graphite strips projecting into the rectangular opening in the shield. This assembly including the grid support 150 the graphite grid 145 and the shield plate 151 is mounted on studs 157 which are threaded into recesses in the ring 158. Coaxial springs 159 in conjunction with the studs 157 permit adjustment of the position of the grid assembly with respect to the tube 102.

The second and third grids are supported by the copper supporting frames 149 and 148 respectively which are slotted at their leading edges (i. e. with respect to the beam) as indicated in Figure 14 to receive the tungsten wires held in tension by flat springs 160. The third grid thus presents a passage to the ion beam which is the same size as the opening in the shield plate. The wires on each of the second and third grids have their axes parallel to the long axes of the graphite strips as shown in Figure 14 thus presenting a plurality of narrow elongated apertures or slits for the ions to pass through and generally presenting a substantially electrode to the ion beam.

The third grid assembly is adjustably spaced from the first grid by means of the screws 161 which pass through larger openings 155 drilled in supporting frame 149. Since the first and third grids are both at the same potential they need not be insulated from each other. However, the second grid carries the radio frequency potential oscillating at about five megacycles used to initiate the formation of the ion bunches as previously described and hence must be electrically insulated from the others. It is obvious that many methods of assembly can be followed, the one shown has been found surprisingly adaptable to many varying conditions encountered in the use of the entire device. In order to permit adjustment of the position of the second grid with respect to the other two and yet maintain the electrical independence the following floating type construction was used. Supporting frames 148 and 150 have holes drilled thru them, for example, four, to accommodate quartz rods 162 and 163 which fit into recesses in supporting frame 149. A spring, maintained in spring retaining cup 164 soldered to frame 148, presses against quartz rod 162 and causes frame 149 to press quartz rod 163 against the adjustment screw 165 theaded into the boss 166 formed by brazing a brass nut to frame 150.

Now, if it is desired to move frame 149 in a horizontal direction, that is back or forward along the axis of the ion beam, turning adjustment screw 165 causes the quartz rod 163 to exert pressure on supporting frame 149 and therethrough to exert pressure on the rod 162 and the spring in the retaining cup 164. Thus is may be seen that supporting frame 149 floats between frames 148 and 150 and is electrically insulated therefrom.

In order to afford complete flexibility of adjustment, frames 149 and 148 may be moved from side to side with respect to the axis of the beam through the use of the adjustment mounting shown in Figure 14. A copper block 167 is attached to frame 150 by means of screws 168. Two adjustment screws are accommodated in threaded holes in block 167 for example, screw 170 presses against a cushion block 171 attached to frame 148, and screw 172 is recessed at its end to accommodate a quartz spacer 173 which fits into a recess in cushion block 174. A similar adjustment mounting attached to frame 150 on the opposite side of the assembly gives two point support and adjustment means for controlling the positions of the frames 148 and 149, with respect to each other and frame 150 in a plane perpendicular to the axis of the ion beam.

The entire buncher assembly as above described is supported in a fixed position within the tube by means of the brass supporting ring 158. This position may be rigidly maintained through the use of tapered screws 176 which engage threaded tapered holes in the ring 158. By slitting the ring 158 at the tapered holes, sufficient expansion may be obtained when screws 176 are turned inwardly to cause a tight fit between the ring 158 and tube 102.

As has been previously stated, the buncher assembly is utilized to control the ion energies through the employment of an R. F. potential. It is also clear that the ion bombardment which occurs in the buncher will cause a substantial temperature rise in the component elements making it desirable to cool the entire assembly. One way in which both of these remaining problems can be answered is to use hollow copper conductors 177 and 178 soldered to the supporting frames through which a liquid coolant may be circulated. Conductor 178 is also used to carry the increment R. F. potential applied to grid 146. These tubes are brought through the walls of the tube 102 by means of sealing and insulating bushings 179 in the port 180 which may be seen better in Figure 8.

As has already been pointed out, the buncher design may be varied in many ways; the variations giving rise to differences in efficiencies which should be recognized in the planning of an isotope separation device constructed according to the principles of the present invention. One such variation is in the use of two grids in the manner shown in Figure 15. In this embodiment of the buncher element a plate 185 which is, for example, stainless steel has a rectangular passage cut therethrough to accommodate brass frames 186 which are brazed in place. The frames have a number of vertical slots, thirty-seven for example, cut in their leading edges, each slot being about twenty-five thousandths of an inch in width. Vertical tungsten grid wires 187 are accommodated in the slots and are held in place under a predetermined tension by being attached to bronze leaf springs 188 which are made integral with the frames 186 by means of screws 189. Vertical strips 190 of graphite are disposed in vertical alignment with the grid wires 187 and are held in position by wire hooks 191 which engage leaf springs 192 supported on the brass frames 193. To assemble the two grids formed thus, two copper plates 194 disposed on opposite sides of the assembly are fixed in spaced relationship with the frame 193 by means of the screws 195. The frame 193 and the plates 194 are arranged about the plate 185 in an adjustable floating manner such as is described above in connection with the three grid buncher. That is, the frame 185 is recessed to accommodate cylindrical quartz spacers 196 which are maintained under equalized pressure by springs in the cups 197 brazed to the frame 193 and the adjustment screws 198 threaded through the bosses 199, adjustment mechanisms to permit alignment (in the beam direction) of the strips and the grid wires similar to that described hereinbefore may also be provided. Copper tubes 201 and 202 for carrying liquid coolant are brought to the outside of the tube 102 through insulating bushings in the sealing port 180 shown in Figure 8.

The radio frequency bunching potential, for example, at a frequency of five megacycles, is applied to the graphite strips through the hollow conductor 201 (which also carries a liquid coolant to the assembly) by means of the electrical connection made outside the port 180 with a conductor from the power supply 111. The wire grid 187 is at ground potential as may be seen clearly in the drawing by reason of the brass supporting studs 203 which maintain the assembly in position in the tube 102 in direct conducting electrical relationship. Adjustment of the position of the buncher assembly with respect to the source screen is accomplished by rotation of adjustment nuts 204 which have as an integral part cylindrical portions 205 grooved to receive a follower 206 attached to the plate 185 by the screws 207.

It will be seen from the above that the buncher element just described is really a part of a combined accelerator and buncher. If the gap between the source screen 104 (indicated by the broken line in Figure 15) and the graphite grid 190 is made equal to $\delta$ (i. e. the distance the ions travel during one period of the buncher voltage which in a typical operation is one-eightieth of the distance between buncher and analyzer) that gap becomes the accelerating gap. However, it should be noted that if the accelerating gap is not even partially space charge limited the average speed of the ions will be half their final velocity, the buncher will operate with the gap length any multiples of $$\frac{\delta}{2} \left( \text{i. e. } \frac{2\delta}{2}, \frac{3\delta}{2} \text{ etc.} \right)$$

Furthermore, if the gap is completely space charge limited, the average speed of the ions is one-third the final speed so the gap may be made one of the lengths $$\frac{\delta}{3}, \frac{2\delta}{3}, \frac{3\delta}{3} \text{ etc.}$$

Thus the source screen may be considered a part of the buncher and as has already been shown is at the potential of the source (e. g. $V_s$=20 kv.). The second electrode is then the graphite grid in which the strips for example are spaced about three-eighths of an inch apart to which the buncher voltage is applied relative to ground. The third grid then consists of the wire grid 187 placed directly behind the graphite at a distance of about one-quarter inch and grounded.

It should be recognized that in either of the described embodiments of the buncher and in the many variations of these two that exist, certain relationships of the operating parts have been found to be critical.

If, as has been noted, the sawtooth velocity wave is to be synthesized by the use of two harmonics of the buncher voltage, it is not necessary to design the buncher so that the energy obtained by the ions for a particular frequency is equal to or in phase with the applied buncher voltage. The applied voltage may be adjusted in amplitude and phase to compensate for the relation between the energy obtained by the ions and the voltage so that the energy obtained by the ions will have the desired wave form.

With the ions proceeding down the tube and in the process of being formed into bunches as shown in Figure 1, the next step in the separation process takes place in the analyzer 108, various detailed views of which appear in Figures 16, 17, 18 and 19. It includes a brass mask plate 210 having a substantially rectangular opening therethrough which serves to define the beam and eliminate stray bunches of ions and/or individual ions. This defining or mask plate is rigidly connected to the analyzer support plate 211 by means of the four brass support spacers 212 and screws 213. The support plate 211 also has attached to it the grid supports 214 and in turn connecting members 215 and the second grid supports 216. The first grid 217 is made up of a series of vertically disposed tungsten wires 218 spaced by means of holes cut in the channel brass grid blocks 219 and maintained under tension by helical bronze springs 220 which are removably attached to the said blocks 219. The function of this grid, which is maintained at ground potential, is to prevent the field created by potentials applied to other elements of the analyzer as hereinafter described from extending into the tube in a direction toward the buncher and thus disrupting or interfering with the bunch formation.

The second operating element or grid 224 of the analyzer includes two horizontal brass blocks 221 and 222, supported perpendicular to the beam direction by the connecting members 216, to which are attached slotted bronze leaf springs 223 in an insulated manner which is described later. The springs support under tension tantalum grid strips 224 which are, for example, about 8 inches long, three-eighths inch wide and four mils in thickness. In order to permit close spacing of the tantalum strips the springs 223 are attached to the horizontal supporting blocks on two levels as may be seen in Figure 17. The grid strips 224 have pins 225 set about a quarter of an inch from each end so that when the strips are slipped into the slots of a leaf spring 223 in the upper tier of springs in block 221 and the leaf spring in the lower tier of block 222 that is in vertical alignment, the pins 225 will engage the springs and permit tension to be applied to the grid strips 224.

As has been pointed out, the springs are insulated from the blocks 221 and 222 and from each other. This is accomplished by using blocks 226 of Mycalex or other suitable insulating material which are drilled and countersunk to accommodate screws and nuts 227 used to hold the springs 223 in rigidly spaced relationship. After assembly with the springs 223, the Mycalex insulating blocks 226 are attached to the supporting blocks 222 and 221 by screws not shown in the drafting.

To enclose the assembly a brass shield plate 228 having a rectangular opening for the passage of the beam is attached to the support blocks 222 and 221. Tubes 229 for the circulation of a liquid coolant are soldered to the mask plate 210 to prevent overheating due to ion bombardment, during operation. These tubes are brought to the outside of the tube 102 through suitable sealing couplings which are not shown.

The position of the analyzer element in relation to the buncher is fixed according to the relationships heretofore set out at length and more particularly is at a distance equal to L (as defined above) from the buncher. By Equation 1a ($\delta$) is found to be 2.57 centimeters for an accelerating voltage of twenty kilovolts and a buncher frequency of five megacycles. A satisfactory distance is then found to be one hundred forty centimeters in operation of the apparatus for the separation of the uranium isotopes noted above based upon Equation 18. When this position is determined the analyzer may be held in place by wedges (not shown) inserted between the support plate 211 and the wall of tube 102. However, other mountings which will facilitate desired changes of the position of the analyzer (i. e. changes in L) may be found useful and may be readily designed by anyone familiar with the functions of the element.

In order to focus the ion beam and effect the final separation step, it is necessary to apply different direct current potentials to the grid strips 224. If a narrow ion beam was to be analyzed the analyzer in its simplest form would consist merely of a pair of short parallel plates to which an alternating voltage of the same frequency as that of the buncher is applied. This type of element would deflect the beam alternately from side to side, to one side when one isotope, for example uranium 235, passed through the element and to the other side when other isotopes as uranium 238 passed through the element.

However, when a wide ion beam is to be analyzed the problem is more complex. The two plates originally used cannot be separated by a greater distance since that would spread the field between the plates to an extent that the time necessary for ions to pass through may be several periods of the alternating voltage.

In the analyzer arrangement described above provision is made for analyzing the ion beam in two parts. That is, in order to effect maximum focusing of the beam while minimizing the potential necessary to accomplish this result, the focusing potentials are applied to the grid strips 224 symmetrically about two centers, thus effectively forming two focused beams. This arrangement will be seen more clearly from an examination of the schematic wiring diagram of Figure 19. A direct current negative potential from the power supply 109 (Figure 6) passes through the variable resistor 240 to the wire wound fixed resistor 241. Now, by tapping the applied direct current voltage off at various points on this resistor 241 through, for example, the four conductors 242, the two center grid strips 243 may be made effectively more negative than those immediately adjacent which in turn are effectively more negative than the next outward adjacent pairs and the same conditions followed for successive pairs. Thus it will be seen that the least negative grid strips are the strips 244 which are maintained at ground potential. Now, for example, if a direct current potential of about 2880 volts negative are applied to strips 243 and strips 244 are maintained at ground potential, it is possible by properly adjusting the voltage of the respective pairs about these centers 243 to focus the incident ion beam into two parts with one focus aligned with the right side center and the other focus in line with the left side center.

With this narrowing of the two portions of the beam accomplished, the movement of the focus from side to side to effect the final isotope sepation, by causing the desired isotope to be deposited in a predetermined zone, is brought about by impressing a radio frequency potential on the strips. As has been noted, this potential is of the order of 1400 volts and a frequency of half the buncher frequency, for example, 2.5 megacycles in the arrangement described. This potential is supplied from the grounded power supply 111 through, for example, the five conductors 245 to alternate strips and returned on the remaining strips to ground to complete the circuit.

Suitable condensers 246 are disposed in the radio frequency supply and return circuits; and suitable chokes 247 are placed in the direct current supply to prevent mixing of the two potentials. Due to the subatmospheric state at which the entire apparatus is maintained, it has been found preferable to make the ground connections mentioned inside the tube to minimize the number of leads brought to the outside of the tube. As will be seen by reference to Figures 8 and 9 direct current focusing potentials are brought into the analyzer through the four taps 248 sealed in quartz insulators 249 which in turn are sealed in the port 250. Similarly, the radio frequency potential is brought through the walls of the tube through insulated taps 251 disposed in the port 252. The chokes 247 and condensers 246 are preferably located at the outside of the tube for reasons of accessibility and simplicity of structure and may be made integral with the respective power supplies 111 and 109.

While the indication in the drawings of the R. F. potential supply circuits of the buncher and analyzer are largely schematic, some details of the network employed are indicated in Figure 20. The circuits of the network components are well known in the electronic art and are not given here.

It is desirable in practice, that the radio-frequency supply for the buncher and analyzer should be derived from a suitable crystal oscillator so that stability of the supply is assured. The output from this crystal oscillator may be amplified and fed through a phase control device, further amplified and frequency doubled and fed to the analyzer through a suitable coupling unit, due care being taken to isolate the direct current focusing voltage applied to the analyzer strips from the radio-frequency voltage and vice versa. To minimize the losses and simplify construction, radio-frequency power is carried from the final amplifier of the R. F. supply to the analyzer coupling unit by a non-resonant transmission line, and an impedance matching device is employed between the line and the analyzer.

The supply to the buncher is more complicated in that a first and second harmonic frequency voltage are employed to approach the sawtooth form most desirable, and the first harmonic is twice the frequency of the supply fed to the analyzer. The supply of the second harmonic for the buncher may be obtained as shown by feeding the output of the crystal oscillator through a buffer doubler, a suitable amplifier and phase control device, frequency doubler circuits, and further doubler and amplifier stages. The first harmonic is supplied through the units indicated including a buffer doubler amplifier and other amplifying stages. The radio-frequency power comprising the first and second harmonic for the buncher is preferably connected by non-resonant transmission lines to a buffer coupling unit which functions also as an impedance transformer and should include a filter to prevent one harmonic from coupling seriously into the non-resonant line of the other harmonic.

In adjusting the phase relation of the analyzer R. F. with respect to the buncher R. F. or in adjusting the phase relation of the second harmonic radio frequency supply for the buncher relative to the first harmonic, it is essential that the phase controlling method utilized operate so as to produce no change in output amplitude due either to the control system or due to the changing load it imposes. One method of phase control utilized consists of a pickup coil supported in a uniform magnetic field rotating at the desired frequency or at a small sub-multiple of it. Rotation of the pickup coil changes the phase of the voltage at its terminals by an angle equal to the angle of rotation without effecting the amplitude.

As the ion bunches are moved from side to side as deflected by the alternating potential carried by the strips 224 in the analyzer the ion bunches are deposited in separated collecting zones of the catcher 110. As shown in Figures 21, 22 and 23 a steel plate 255 is clamped to the end of the tube by bolts which engage the flanged end of the tube. Two holes in the plate 255 accommodate compression seals 256 and 257 which include the brass sleeves 258 and rubber gaskets 259 which are pressed against the tubular brass support 260 by the threaded collar 261 which cooperates with an internal thread on sleeves 258. The seal which is substantially of the type described in copending U. S. patent S. N. 547,918, filed August 3, 1944, by Woodward and Smith, permits inward or outward movement of the support 260 and adjustment of its position without deteriorative effects on the vacuum maintained within the tube 102.

Housing caps 262 which engage external threads on the sleeves 258 have threaded holes to accommodate locking screws 263 which abut against the split ring 264 adapted to accommodate the tubular supports 260 as a sliding fit. Ring 265 has a tab 266 extending to the outside of the housing 262 thru a slotted opening provided to permit manual adjustment of the position of the support 260 and thereby the position of the collecting box-like receptacles 271 and 272. The ring 265 is locked in position on the supports 260 by locking screws 267.

Collection of the separated isotope, for example, in the typical operation chosen, uranium 235, is carried out in the box-like receptacles 271 and 272. As has already been noted in connection with the description of the analyzer, the beam is analyzed and focused into two separate beams in this embodiment by the symmetrical arrangement of the analyzer direct current potentials. As a consequence two collecting zones must be employed. Either structure of the elements shown may be used in a given embodiment, but for the purposes of illustration both types have been incorporated in the complete assembly.

Collector 271 is a comparatively simple structure comprising a rectangular box 273 with stainless steel face plates 274 attached thereto by means of screws. An opening between the face plates 274 permits communication between the space 275 within the box 273 and the tube 102 and affords an extra passage for the desired isotope, e. g. uranium 235. The ions entering the space 275 impinge upon the copper deflector 276 and are scattered to the walls 273. A thin platinum sheath 277 removably mounted within the box structure acts as the collecting surface. Since the deflecting plate 276 is subjected to a substantial amount of ion bombardment with consequent tendency to become extremely hot, it was found that the introduction of a liquid coolant in heat transfer relationship with the deflecting plate would be desirable. This was done by rigidly supporting the plate 276 on a hollow copper conductor 278 and extending a squirt tube 279 coaxial and in spaced relationship within the conductor 278 to a point within the plate 276. Thus a liquid coolant carried by the squirt tube is brought into heat transfer relationship with the plate 726 and is carried off through the annular space between the conductor 278 and the squirt tube 279 to a suitable discharge basin. The electrode 278 is insulated by a sealed quartz tube 280 from the support tube 260 and extends to the outside thereof through the type seal 281. A small positive direct current voltage applied to the plate 276 through the hollow conductor 278 can then be utilized to de-energize the ions coming into the space 275 and scatter them to the collecting films 277. A copper tube 282 which extends as a continuous passage for a liquid coolant around the box 273 is soldered to the outside of the box and passes to the outside of support tube 260 through sealing bushings 283. Collector 272 which is an alternate type and has certain advantages which will be brought out, is a more elongated copper rectangular box than the collector 271. A relatively narrow passage is presented by the spaced relationship of the stainless steel face plates 285.

Platinum sheathed collection plates 286 are supported within the collector 272 and spaced from the walls thereof. It is preferred to make these plates of copper covered by a removable thin platinum foil. By the use of this type of collecting means, quantities of the collected isotope may be periodically removed from the apparatus and undue contamination of the entire collector avoided. Random deposition of ions that come into the zone 287 defined by the collector 272 is prevented by two expedients. First, a copper recoil plate 288 is provided which is supported by insulator studs and upon which the ions which may impinge are scattered toward the collecting plates 286. Second, a high positive direct current potential is applied to plate 289 through the quartz insulated conductor 290 which causes the ions to be sharply deflected toward plate 288 which is connected to the negative side of the same potential source through the quartz insulated conductor 291.

The cooling water tube 292 and conductors 290 and 291 pass through the compression seal 293 disposed at the outer end of the tubular support 260 which is rigidly attached to the back plate of collector 272.

As has been noted, in order to obtain satisfactory operation of the separating apparatus a vacuum of the order of $10^{-5}$ millimeters of mercury must be maintained within the tube 102. This subatmospheric state is achieved by connecting to the tube 102 a mechanical vacuum pump of any well known type at the flanged outlet 300 (see Figure 9) which is used for rapid or roughing evacuation and in addition a mercury or oil diffusion pump system of sufficient capacity indicated by the connecting flange 301 is connected to the tube through a gate valve 302 which is shown in detail in Figure 24. For similar reasons the liquid air trap 330 is provided. Since periodic removal of the separated isotopes is necessary (which in turn necessitates breaking the vacuum by allowing air to enter the tube through the inlet 331) the use of the gate valve 302 permits more rapid evacuation when the tube is sealed again subsequent to such removal. Referring now to Figure 24, the valve includes a brass body 303 adapted to be connected by screws through flange 304 to the intake of a diffusion pump and through flange 305 to the separator tube 102. Gaskets 306 are provided at such flanged connections to provide a complete subatmospheric seal. The gate, which is rotatably mounted on ball bearings maintained in contact with the operating rod 307 includes a brass plate 308 with a conical recess at the center to accommodate the single ball thrust bearing 309, a split bearing retaining collar 310 attached to the plate 308 by means of screws and the ball bearings 311.

Two sealing ports 312 and 313 are provided with rubber gaskets 314 against which the gate is pressed when the valve is closed. The necessary pressure to properly seal either of the ports is obtained by providing a locking pin 315 which cooperates with the cam surfaces 316 on guide tube 317. Thus, for example, if the gate 308 is pressed against port 313 and the operating rod turned in a counter clockwise direction, the action of the pin and the cam surface 316 will force the gate into pressure and sealing contact with the gasket 314 around the port 313. Similar action is obtained when contact is made with port 312 and the rod 307 rotated in a clockwise direction.

The guide tube 317 is made integral with the sealing gland 318 which extends through the end plate 319 and is soldered or brazed to it. The gland includes a tubular body 320 having a shoulder on its cylindrical surface to abut against the end plate 319 and an inner shoulder shaped to cooperate with the brass ring 321 in pressing the rubber gasket 322 against the slidably and rotatably mounted operating rod 307. Ring 323 is similarly shaped to cooperate with ring 321 to accomplish the same result with gasket 324.

To provide pressure on the rings 321 and 323 and to enclose the gland assembly and act as a bearing for the operating rod 307 a brass collar 325 is adapted to engage the internal threads on the gland body 320.

As an added precaution against air leakage the space immediately to the outside of gasket 322 may be evacuated by attaching a vacuum pump to the connection 326 which communicates with said space.

Ion gages 332 are provided at the valve 302 and on the tube to indicate the pressure values at those points. These gages are standard types, well known in the art, which permit an observer to read on a suitable meter either the actual air or gas pressure or the ionization current which is proportional to the amount of gas present. It has also been found useful to provide windows 333 at various points in the tube 102 so that the action of the ion beam at various points as well as the operation of the elements of the tube can be observed. Band supports 334 are provided to prevent undue stresses on the many flanged sealing joints along the tube 102. Tubes 335 carrying liquid coolant are placed around the tube 102 and spaced throughout its length to effectively remove heat generated within the tube and to provide for more efficient operational conditions.

In connection with the construction and operation of separating apparatus of the class described, a number of the design features incorporated therein depend upon the production scale contemplated. It will then be understood that the most favorable operating conditions from the standpoint of large scale, rapid separation is obtained by modification which is based upon other factors. It has already been shown that in order to overcome the effects of space charge, it is desirable to fix the distance between the buncher and the analyzer according to the other parameters involved, such as for example, to maximize the beam current or to retain the accelerating voltage within practical limits. Such changes in spacing of the electrodes may reduce the separation obtained in a particular unit. However, if a large number of units are operated in cascade, the overall result from the standpoint of the separation finally obtained in the length of time necessary to obtain it, may be most desirable.

The principle of the cascade is the same as for separating units of any other kind. Each stage consists of a large number of identical isotrons operating in parallel. The enriched material produced by a given stage is used as the input to the ion source of the next following stage. The impoverished material—i. e., the material that passes through the analyzer but deposits outside the collector—is sent backwards and included in the input to the preceding stage. The material that is not separated at all, but deposits on the walls of the tube and of the ion source chamber is recovered and fed back with the input to the same stage. The enriched material thus moves forward along the cascade; the impoverished material moves backward, and the unseparated material is recycled.

In planning such a cascade system, it should be remembered that the device of the present invention treats each item of the original mixture essentially independently of all the others, and the ratio of, for example, two materials in an enriched sample, is always a certain fixed multiple $\sigma$ of that ratio in the input material. Thus, in the case of the uranium separation process hereinabove mentioned:

$$\left(\frac{U^{235}}{U^{238}}\right)_{\text{enriched}} = \sigma \left(\frac{U^{235}}{U^{238}}\right)_{\text{input}}$$

This ratio is independent of the concentration of the materials in the input mixture.

It has been found in the operation of an isotron separator that an attempt to increase the separation factor, $\sigma$ of a given isotron, e. g., by reducing the beam current or the efficiency $\eta$ generally results in decreasing the amount of enriched material produced per unit time, $p$. In order that the total number of isotron units required in the cascade operation be as small as possible, it is desirable to compromise between $p$ and $\sigma$. If there are no irretrievable losses in the processes so that material is recovered from the isotron tubes after rejection therein and is purified and treated for feeding back to the ion sources, it can be shown that the best way to compromise is to make the quantity $W$, defined by $W = p \log \sigma$ maximum for each isotron.

While one form of the novel apparatus constructed according to the principles of the present invention has been described, it is not intended to limit the scope of the invention thereto. As was pointed out hereinbefore, this specifically described isotron was successfully employed for the separation of uranium isotopes and the particular forms of the electrodes and other components employed therein were adapted for that operation. It is apparent that many variations in the construction of the various elements and the assembly thereof will suggest themselves to one skilled in the art depending upon the conditions of the particular material separation to be carried out and the parameters hereinbefore set forth. It is therefore intended that no limitation be placed on the scope of the present invention except as may be imposed in the appended claims.

I claim:

1. Apparatus for separating materials of slight mass differences such as isotopes, comprising in combination, a chamber having a rarefied atmosphere therein, a source of ions of the materials to be separated in said chamber, bunching electrodes in said chamber, a source of high frequency oscillations of substantially sawtooth wave form connected to said bunching electrodes for forming bunches of said ions substantially according to their masses, sectionalized collector means, and electrical means for propelling said ion bunches into different sections of said collector means.

2. Apparatus for separating materials of slight mass differences such as isotopes, comprising in combination, a chamber having a rarefied atmosphere therein, a source of ions of the materials to be separated in said chamber, bunching electrodes in said chamber, a source of high frequency oscillations connected to said bunching electrodes for forming bunches of said ions substantially according to their masses, a pair of said bunching electrodes being separated by a distance equal substantially to the bunch distance of said ions, sectionalized collector means, and electrical means for propelling said ion bunches into different sections of said collector means.

3. Apparatus for separating materials of slight mass differences such as isotopes, comprising in combination, a chamber having a rarefied atmosphere therein, a source of ions of the materials to be separated in said chamber, bunching electrodes in said chamber, a source of high frequency oscillations, amplifier means connected between said source and said bunching electrodes for impressing amplified high voltages on said bunching electrodes for forming bunches of said ions substantially according to their masses, collector means, and electrical means for propelling selected ones of said ion bunches into said collector means.

4. Apparatus for separating materials of slight mass differences such as isotopes, comprising in combination, a chamber having a rarefied atmosphere therein, a source of ions of the materials to be separated in said chamber, bunching electrodes in said chamber, a source of high frequency oscillations of substantially sawtooth wave form connected to said bunching electrodes for forming bunches of said ions substantially according to their masses, collector means, and electrical means for propelling selected ones of said ion bunches into said collector means.

5. Apparatus for separating materials of slight mass differences such as isotopes, comprising in combination, a chamber having a rarefied atmosphere therein, a source of ions of the materials to be separated in said chamber, bunching electrodes in said chamber, a source of high frequency oscillations connected to said bunching electrodes for forming bunches of said ions substantially according to their masses, collector means, focusing electrodes, a source of direct current potential for said focusing electrodes for focusing said ions on said collector means and means for connecting said source of high frequency oscillations to said focusing electrodes for deflecting undesired ion bunches from said collector means.

6. Apparatus for separating materials of slight mass differences such as isotopes, comprising in combination, a chamber having a rarefied atmosphere therein, a source of ions of the materials to be separated in said chamber, bunching electrodes in said chamber, a source of high frequency oscillations, amplifier means for developing substantially sawtooth wave form oscillations from said source connected to said bunching electrodes for forming bunches of said ions substantially according to their masses, collector means, and electrical focusing means connected to said source of high frequency oscillations for concentrating selected ones of said ion bunches into said collector means.

7. Apparatus for separating materials of slight mass differences such as isotopes, comprising in combination, a chamber having a rarefied atmosphere therein, a source of ions of the materials to be separated in said chamber, bunching electrodes in said chamber, a source of high frequency oscillations, amplifier means for developing substantially sawtooth wave form oscillations from said source connected to said bunching electrodes for forming bunches of said ions substantially according to their masses, collector means, and electrical focusing means for concentrating all of said ion bunches into said collector means and means for varying the energization of said focusing means to concentrate only ions of selected masses into said collector means.

8. Apparatus for separating materials of slight mass differences such as isotopes, comprising in combination, a chamber having a rarefied atmosphere therein, a source of ions of the materials to be separated in said chamber, bunching electrodes consisting of a pair of electrodes spaced substantially a bunch distance apart, a source of high frequency oscillations connected to said bunching electrodes for forming bunches of said ions substantially according to their masses, collector means, and analyzer electrodes having a length parallel to the path of said ions equal approximately to the bunch distance for concentrating said ion bunches into said collector means, and commutating means for periodically varying the energization of said analyzer electrodes to shift the undesired bunches from said collector.

9. Apparatus for separating materials of slight mass differences such as isotopes, comprising in combination, a substantially evacuated chamber, a source for generating ions of the materials to be separated, means for supporting said source in said chamber, a high frequency generator, electrode means positioned close to said ion source, means for developing substantially sawtooth wave form oscillations from said generator, connections between said last mentioned means and said electrode means for impressing said substantially sawtooth oscillations on said electrode means for variably accelerating the ions given off by said source according to the masses thereof during each cycle of said high frequency, deflector electrodes supported in said chamber and displaced from said first mentioned electrode means a sufficient distance to permit said variably accelerated ions to form bunches according to their masses before passing through said deflector electrodes, means for applying high frequency potential to said deflector plates from said high frequency generator synchronized with said ion bunches to deflect the undesired bunches of said ions of one mass, and collector means positioned to receive the bunches of ions of desired masses.

10. Apparatus for separating materials of slight mass differences such as isotopes, comprising in combination, a substantially evacuated chamber, a source for generating ions of the materials to be separated, means for supporting said source in said chamber, a high frequency generator, electrode means positioned close to said ion source, means for developing substantially sawtooth wave form oscillations from said generator, connections between said last mentioned means and said electrode, means for impressing said substantially sawtooth oscillations on said electrode means for variably accelerating the ions given off by said source according to the masses thereof during each cycle of said high frequency, deflector electrodes supported in said chamber and displaced from said first mentioned electrode means a sufficient distance to permit said variably accelerated ions to form bunches according to their masses before passing through said deflector electrodes, means for applying high frequency potential to said deflector plates from said high frequency generator synchronized with said ion bunches to deflect bunches of said ions of one mass in one direction and bunches of ions of another mass in another direction, and collector means positioned to receive the bunches of ions of different masses.

11. Apparatus for separating materials of slight mass differences such as isotopes, comprising in combination, a substantially evacuated chamber, a source for generating ions of the materials to be separated, means for supporting said source in said chamber, a high frequency generator for generating pulsating electrical potential of high frequency, electrode means positioned close to said ion source, connections between said high frequency generator and said electrode means for impressing said high frequency pulsating electrical potential on said electrode means for variably accelerating the ions given off by said source according to the masses thereof during each cycle of said high frequency, deflector electrodes supported in said chamber and displaced from said first mentioned electrode means a sufficient distance to permit said variably accelerated ions to form bunches according to their masses before passing through said deflector electrodes, means for applying high frequency potential, from said high frequency generator to said deflector plates, phase shifting means for synchronizing said high frequency potential applied to said deflector electrodes with the passage of selected bunches of said ions therethrough for deflecting said selected bunches, and collector means positioned to receive the bunches of ions of different masses.

12. Apparatus for separating materials of slight mass differences such as isotopes, comprising in combination, a substantially evacuated chamber, a source for generating ions of the materials to be separated, means for supporting said source in said chamber, a high frequency generator for generating oscillations of substantially sawtooth wave form, electrode means positioned close to said ion source, connections between said high frequency generator and said electrode means for impressing said oscillations on said electrode means for variably accelerating the ions given off by said source according to the masses thereof during each cycle of said high frequency, deflector electrodes supported in said chamber and displaced from said first mentioned electrode means a sufficient distance to permit said variably accelerated ions to form bunches according to their masses before passing through said deflector electrodes, means for applying a direct current focusing potential to said deflector electrodes, means for applying high frequency potential to said deflector plates from said high frequency generator synchronized with said ion bunches to deflect the focused bunches of the undesired ions of one mass, and collector means positioned to receive the focused bunches of ions of the desired masses.

13. Apparatus for separating materials of slight mass differences such as isotopes, comprising in combination, a substantially evacuated chamber, a source for generating ions of the materials to be separated, means for supporting said source in said chamber, a high frequency generator for generating pulsating electrical potential of high frequency, electrode means positioned close to said ion source, connections between said high frequency generator and said electrode means for impressing said high frequency pulsating electrical potential on said electrode means for variably accelerating the ions given off by said source according to the masses thereof during each cycle of said high frequency, deflector electrodes supported in said chamber and displaced from said first mentioned electrode means a sufficient distance to permit said variably accelerated ions to form bunches according to their masses before passing through said deflector electrodes, means for applying high frequency potential to said deflector plates from said high frequency generator synchronized with said ion bunches to deflect bunches of the undesired ions, and collector means positioned to receive the bunches of the desired ions.

14. Apparatus for separating materials of slight mass differences such as isotopes, comprising in combination, a substantially evacuated chamber, a source for generating ions of the materials to be separated, means for supporting said source in said chamber, a high frequency generator for generating pulsating electrical potential of high frequency, electrode means positioned close to said ion source, connections between said high frequency generator and said electrode means for impressing said high frequency pulsating electrical potential on said electrode means for variably accelerating the ions given off by said source according to the masses thereof during each cycle of said high frequency, deflector electrodes supported in said chamber and displaced from said first mentioned electrode means a sufficient distance to permit said variably accelerated ions to form bunches according to their masses before passing through said deflector electrodes, means for applying high frequency potential to said deflector plates from said high frequency generator synchronized with said ion bunches to deflect bunches of said ions of one mass in one direction and bunches of ions of another mass in another direction, and collector means positioned to receive the bunches of ions of different masses.

15. Apparatus for separating materials of slight mass difference such as isotopes comprising in combination, an elongated chamber having a rarified atmosphere therein, a source of ions insulatingly supported in said chamber proximate one end thereof, a plurality of electrically conducting grids constituting a bunching electrode supported in said chamber proximate the ion source and transverse to the elongation of said chamber, means for impressing an accelerating potential between the ion source and at least the first one of said bunching electrode grids, means for impressing an alternating potential between at least two of said bunching electrode grids for forming bunches of said ions substantially according to their respective masses, an analyzer electrode comprising a plurality of deflector electrodes insulatingly supported one from another in a plane transverse to the elongation of the chamber, means for impressing focussing potentials on said deflector electrodes to selectively deflect material particles of different masses; the distance L between the analyzer electrode and the bunching electrode being determined by the relation $$L = \frac{1}{2f} \frac{\sqrt{2eV_s}}{\sqrt{m_1} - \sqrt{m_2}}$$

in which $f$ is the frequency of the said alternating potential, $e$ is the charge on the particles, $V_s$ is the accelerating potential and $m_1$ and $m_2$ are the masses of the respective materials.

ROBERT R. WILSON.

REFERENCES CITED

The following references are of record in the file of this patent:

UNITED STATES PATENTS

| Number | Name | Date |
| --- | --- | --- |
| 2,220,839 | Hahn | Nov. 5, 1940 |
| 2,355,658 | Lawlor | Aug. 15, 1944 |
| 2,387,550 | Winkler | Oct. 23, 1945 |

OTHER REFERENCES

Journal of Applied Physics, volume 10, May, 1939, pages 321–327, "A High Frequency Oscillator and Amplifier" by Varian et al. Copy in Patent Office Library.

Proceedings of Institute of Radio Engineers, February 1939, pages 106–116; "Velocity-Modulated Tubes" by Hahn et al. Copy in Patent Office Library.